United States Patent
Dimino et al.

(10) Patent No.: US 12,169,713 B2
(45) Date of Patent: Dec. 17, 2024

(54) MANAGING ARTIFACT INFORMATION INCLUDING FINDING A SEARCHED ARTIFACT INFORMATION ITEM

(71) Applicant: Siemens Industry Software GmbH, Zürich (CH)

(72) Inventors: Gerlando Dimino, Prague (CZ); Jakub Stroleny, Prague (CZ); Radomir Vencek, Dobříš (CZ)

(73) Assignee: Siemens Industry Software GmbH, Zürich (CH)

( * ) Notice: Subject to any disclaimer, the term of this patent is extended or adjusted under 35 U.S.C. 154(b) by 186 days.

(21) Appl. No.: 18/114,408

(22) Filed: Feb. 27, 2023

(65) Prior Publication Data

US 2023/0281009 A1    Sep. 7, 2023

Related U.S. Application Data

(63) Continuation of application No. PCT/EP2022/055099, filed on Mar. 1, 2022.

(51) Int. Cl.
*G06F 8/73* (2018.01)
*G06F 16/11* (2019.01)
*G06F 16/14* (2019.01)

(52) U.S. Cl.
CPC .............. *G06F 8/73* (2013.01); *G06F 16/128* (2019.01); *G06F 16/148* (2019.01)

(58) Field of Classification Search
None
See application file for complete search history.

(56) References Cited

U.S. PATENT DOCUMENTS

| | | | |
|---|---|---|---|
| 2004/0015483 A1* | 1/2004 | Hogan | G06F 16/93 |
| 2008/0270396 A1* | 10/2008 | Herscovici | G06F 16/313 |
| | | | 707/E17.084 |
| 2009/0222490 A1* | 9/2009 | Kemp | G06F 16/93 |
| 2015/0339282 A1* | 11/2015 | Goyal | G06F 40/197 |
| | | | 715/229 |
| 2017/0220546 A1* | 8/2017 | Codrington | G06F 16/2282 |
| 2018/0189277 A1 | 7/2018 | Mullins et al. | |

* cited by examiner

*Primary Examiner* — Qing Chen
(74) *Attorney, Agent, or Firm* — Lempia Summerfield Katz LLC

(57) ABSTRACT

A computer-implemented method for an improved management of artifact information is provided, particularly for facilitating finding a searched artifact information item in a plurality of artifact documents. The method includes receiving a user's input corresponding to searching a searched artifact information item; determining a document identifier of the artifact document; determining a closest lower snapshot preceding or corresponding to the revision of interest; determining a searched snapshot by appending to the closest lower snapshot; determining the respective document identifier of the respective artifact document including a latest version of the respective searched artifact information item at the revision of interest by intersecting the determined respective document identifier of the respective artifact document with the determined searched snapshot; and displaying information relating to the searched artifact information item at the revision of interest using the respective artifact document corresponding to the determined respective document identifier to the user.

18 Claims, 8 Drawing Sheets

FIG 3 linkage key 126-1 [snapshot 1, 124-1 | Rev 1, 134-1 to Rev 5, 134-5] = 0010 0100 0111 1000 1010 1011
linkage key 126-2 [snapshot 2, 124-2 | Rev 1, 134-1 to Rev 8, 134-8] = ...
linkage key 126-3 [snapshot 3, 124-3 | Rev 1, 134-1 to Rev 11, 134-11] = ...

↓

User input: search WI, 122s with title "hello" at Rev 7, 134-7

↓

Determine the document identifier(s) 120-ID of the artifact document(s) 120 comprising the searched artifact information item 122s:

↓

| Doc 1, 120-1 | 0001 | Includes WI 1, 122-1 |
| Doc 5, 120-5 | 0101 | Includes WI 1, 122-1 |
| Doc 9, 120-9 | 1001 | Includes WI 1, 122-1 |
| Doc 10, 120-10 | 1010 | Includes WI 1, 122-1 |
| Doc 8, 120-8 | 1000 | |
| Doc 12, 120-12 | 1100 | |

↓ linkage key 126 point to closest lower snapshot 124c = snapshot 1, 124-1

↓

Append doc-IDs 122-ID of Rev6 and Rev7: Doc 12, 120-12 (1100) and Doc 13, 120-13 (1101) to closest lower snapshot 124c to get the searches snapshot 124s; here: searched snapshot 124s = 0010 0100 0111 1000 1010 1011 1100 1101, whereby "1100 1101" are appended to closest lower snapshot 124c

↓

Intersect the document identifier(s) 120-ID of the artifact document(s) 120 comprising the searched artifact information item 122s with determined searched snapshot 124s

↓

| Doc 10, 120-10 | 1010 |
| Doc 8, 120-8 | 1000 |
| Doc 12, 120-12 | 1100 |

MANAGING ARTIFACT INFORMATION INCLUDING FINDING A SEARCHED ARTIFACT INFORMATION ITEM

The present patent document is a continuation of PCT Application Serial No. PCT/EP2022/055099, filed Mar. 1, 2022, designating the United States, which is hereby incorporated by reference.

TECHNICAL FIELD

The present disclosure is directed to product lifecycle management (PLM) systems, application lifecycle management (ALM) systems, in particular for software, artifact information systems, and similar systems, which are used to create, use, and manage data for products including software and artifacts and other items (collectively referred to herein as product systems).

BACKGROUND

Product systems may include stored content associated with products including software and artifacts and other items. Such content may involve comprehensive documentation and extensive artifact information which may be edited by several users. The present disclosure generally relates to the management of artifact information, especially to finding a respective searched artifact information item in a plurality of thousands of artifact documents.

Currently, there exist product systems and solutions which support managing artifact information. Such product systems may benefit from improvements.

SUMMARY

Variously disclosed embodiments include data processing systems and methods that may be used to facilitate managing artifact information, especially finding a respective searched artifact information item.

The scope of the present disclosure is defined solely by the appended claims and is not affected to any degree by the statements within this summary. The present embodiments may obviate one or more of the drawbacks or limitations in the related art.

According to a first aspect of the disclosure, a respective document identifier may be assigned to the respective the artifact document. The artifact documents may include at least one artifact information item to which a respective item identifier may be assigned, respectively, wherein the artifact documents may include at least one artifact document assigned to a first revision of a sequence of a plurality of revisions, and at least one artifact document assigned to a subsequent revision. A respective snapshot of a given revision may include the document identifiers of the respective artifact documents including the latest version of the respective artifact information item up to the given revision. Further, a respective linkage key may link the respective revision to the respective snapshot.

A computer-implemented method of finding a respective searched artifact information item in a plurality of thousands of artifact documents may include receiving a user's input corresponding to searching the respective searched artifact information item at a revision of interest. The method may further include determining the respective document identifier of the respective artifact document including the respective searched artifact information item. The method may further include determining the closest lower snapshot preceding or corresponding to the revision of interest using the respective linkage key. The method may further include determining a searched snapshot by appending to closest lower snapshot the document identifiers of the respective artifact documents of the revisions from the given revision of the closest lower snapshot up to the revision of interest. The method may further include determine the respective document identifier of the respective artifact document including the latest version of the respective searched artifact information item at the revision of interest by intersecting the determined respective document identifier of the respective artifact document including the respective searched artifact information item with the determined searched snapshot. The method may further include displaying information relating to the respective searched artifact information item at the revision of interest using the respective artifact document corresponding to the determined respective document identifier to the user via an artifact information management user interface.

According to a second aspect, a computer system may be arranged and configured to execute the acts of this computer-implemented method of managing artifact information.

According to a third aspect, a computer program product may include computer program code which, when executed by a computer system, cause the computer system to carry out this computer-implemented method of managing artifact information.

According to a fourth aspect, a computer-readable medium may include computer program code which, when executed by a computer system, cause the computer system to carry out this computer-implemented method of managing artifact information. By way of example, the described computer-readable medium may be non-transitory and may further be a software component on a storage device.

BRIEF DESCRIPTION OF THE DRAWINGS

FIGS. 2-4 illustrate flow diagrams of example methodologies that facilitate managing artifact information in a product system.

DETAILED DESCRIPTION

Figure 1:
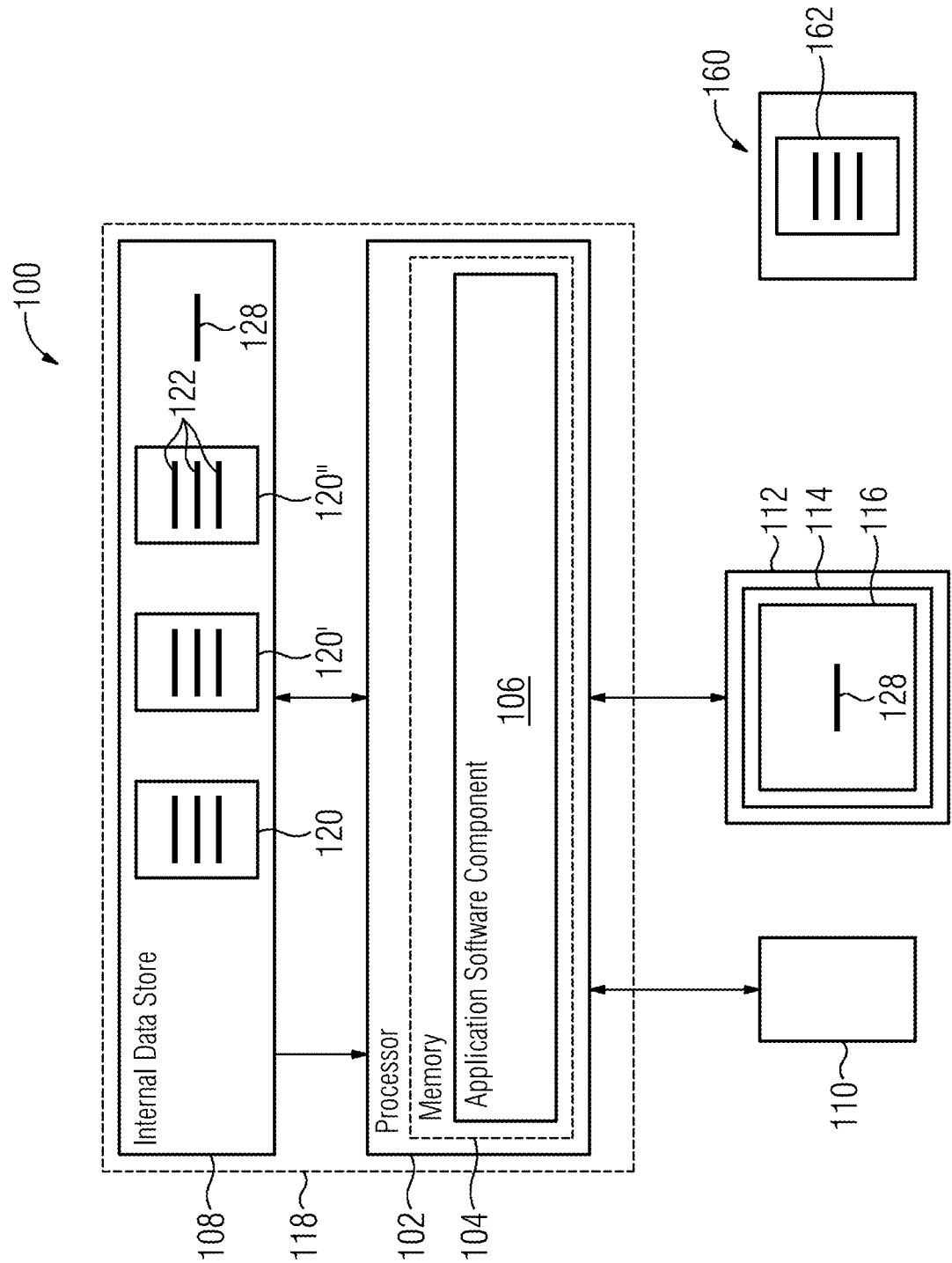
FIG. 1 illustrates a functional block diagram of an example system that facilitates managing artifact information in a product system.

With reference to FIG. 1, a functional block diagram of an example data processing system 118 is illustrated that facilitates managing artifact information. The data processing system 118 may be an artifact information management system or a computer system allowing for artifact information management by providing corresponding functionalities to a user. In the following, the data processing system 118 is assumed to be an artifact information management system 118, whereby is understood that other processing systems 118 including the functionalities of the artifact information management system 118 described herein may also be included by the artifact information management system 118. FIG. 1 further illustrates a larger data processing system 100 which includes the artifact information management system 118 and which may also be a computer system.

The artifact information management system 118 may include at least one processor 102 configured to execute at least one application software component 106 from a memory 104 accessed by the processor 102. The application software component 106 may be configured (e.g., programmed) to cause the processor 102 to carry out various acts and functions described herein. For example, the described application software component 106 may include and/or correspond to one or more components of PLM or ALM software application configured to generate and store product data in a data store 108 such as a database.

Examples of PLM systems that may be configured to include the artifact information management features described herein may include the Active Workspace features of Teamcenter, the NX suite of applications, Solid Edge, and/or LMS Imagine.LAB applications, all of which applications are produced by Siemens Industry Software Inc., of Plano, Texas, USA. Examples of ALM systems that may be configured to include the artifact information management features described herein may include Polarion ALM, an application produced by Siemens Industry Software GmbH, of Zurich, Switzerland. However, the systems and methods described herein may be used in other product systems (e.g., PLM, PDM, ALM systems) and/or any other type of system that generates and stores product data in a database. Also, examples of databases that may be used as one or more data stores described herein include database server applications such as Oracle™, Microsoft™ SQL Server, or any other type of data store that is operative to store data records.

By way of example, the artifact information management system 118 may be cloud-based, internet-based and/or be operated by a provider providing artifact information management support, including, e.g., finding a respective searched artifact information item. The user may be located close to the artifact information management system 118 or remote to the artifact information management system 118, e.g., anywhere else, e.g., using a mobile device for connecting to the artifact information management system 118, e.g., via the internet, wherein the user's device may include an input device 110 and a display device 112. In some examples, the artifact information management system 118 may be installed and run on a user's device, such as a computer, laptop, pad, on-premises computing facility, or the like.

It may be difficult and time-consuming to manage artifact information (e.g., data records representing/storing data corresponding to parts, tools, documents, process descriptions, templates, materials, requirements specifications, software products, software applications) in complex, production PLM or ALM environments. For example, artifact information may be spread in several, if not many artifact documents, wherein these artifact documents may be large files including comprehensive artifact information. Such artifact information may be spread in several or many artifact documents because two or more users or group of users may work and edit their respective artifact document. There may exist a master artifact document and one or several branch artifact documents, wherein two or more users or group of users may edit a respective branch artifact document and optionally also the master artifact document. Further, the artifact documents may include many commits or revisions, e.g., relating to a software being developed. Herein, a commit may be understood as a change in source code which is committed and pushed in a GitHub repository offered by GitHub, Inc. of San Francisco, CA, USA which provides hosting for software development and version control using Git. It offers the distributed version control and source code management (SCM) functionality of Git. Further, a revision may be understood as a change in source code which is committed and pushed in an Apache Subversion (SVN) repository offered by Apache Software Foundation which is a software versioning and revision control system distributed as open source under the Apache License.

Finding a searched artifact information item may be challenging, especially if only the latest version of the searched artifact information item is of interest to the user. In some approaches, such searches may take minutes to be completed or such searches cannot be completed due to a timeout, e.g., the allowed period of time to complete the search has elapsed without a result. Managing artifact information, especially finding a respective searched artifact information item, of many, large and comprehensive artifact documents may require large computation or memory resources or—if these resources are not available—may be a slow and not efficient process or even fail.

To enable the enhanced management of artifact information, the described processing system 118 or 100 may include at least one input device 110 and at least one display device 112 (such as a display screen). The described processor 102 may be configured to generate a graphical user interface (GUI) 114 through the display device 112. Such a GUI may include GUI elements (such as buttons, links, search boxes, lists, text boxes, images, scroll bars) usable by a user to provide inputs through the input device 110 that cause managing artifact information.

In some examples, the artifact information of the respective artifact document 120 and/or of respective artifact information item 122 may include (e.g., parts of) software documentation, software applications, complex data objects, work items, requirements, tasks, change requests, defects or test cases, source code of software products, images, videos, text, webpages, documentation, or any combination thereof. The artifact information may be used in the context of (e.g., agile) software development.

By way of example, the data processing system 118 and/or the application software component 106 may allow for artifact information management by providing corresponding functionalities to a user. In some examples, there may be a plurality of thousands of artifact documents 120, wherein there may be thousands or millions or more artifact information items 122 and wherein the artifact documents 120 include at least one of the artifact information items 122, respectively. Further, a respective document identifier 120-ID may be assigned to the respective artifact document 120, and a respective item identifier 122-ID may be assigned to the respective artifact information item 122. The respective document identifier 120-ID and the respective item identifier 122-ID may allow to unambiguously identify the respective document identifier 120 and the respective item identifier 122.

In some examples, the artifact documents 120 may include at least one artifact document 120 that may be assigned to a first revision 134-1 of a sequence of a plurality of revisions 134. Further, the artifact documents 120 may include at least one artifact document which may be assigned to a subsequent revision 134-2, 134-3, etc. Herein, as already mentioned above, the revision 134 may be understood in the context of software versioning and revision control as a change in source code, here in the artifact information, which is committed and pushed in a repository, e.g., in an Apache Subversion repository. In many examples, there may be tens, hundreds, or thousands of such revisions 134, which may make it challenging to find a searched artifact information item 122s. By way of example, there may be tens, hundreds, or thousands of revisions 134-1, 134-2, etc., wherein each revision 134 may include one or more of the artifact information documents 120.

In some examples, upon creation of a respective new artifact document 120, a respective new document identifier 120-ID may be assigned to the newly created respective the artifact document 120. Accordingly, upon creation of the respective new artifact information item 122, the respective new item identifier 122-ID may be assigned to the newly created respective artifact information item 122. Further, in some examples, determining the respective document identifier 120-ID of the respective artifact document 120 including the respective artifact information item 122s may be done periodically, optionally taking into account the computation and memory resources available or required for this determination. Further information on this aspect may be found below in the context of determining the respective snapshot 124 and optionally the respective linkage key 126.

Further, in some examples, a respective snapshot 124 of a given revision 134-g may include the document identifiers 120-ID of the respective artifact documents 120 including the latest version of the respective artifact information item 122 up to the given revision 134-g, e.g., the first revision 134-1, the second revision 134-2, etc., up to the given revision 134-g. Hereby, a snapshot 124 may be understood as the state of a system, here the partial or complete plurality of the artifact documents 120, the artifact information items 122, and the revisions 134, at a particular point in time, e.g., at a given revision 134-g. In some examples, the respective snapshot 124 may be determined using the respective item identifier 122-ID of the respective artifact information item 122.

For example, a specific artifact information item 122-A may have been introduced for the first time in the artifact formation document 120-001 which is included by the first revision 134-1. Then, this specific artifact information item 122-A may have been amended in the artifact formation document 120-007 which is included by the third revision 134-3. Further, this specific artifact information item 122-A may have been amended further in the artifact formation document 120-012 which is included by the seventh revision 134-7. Later, no further changes may have been made to this specific artifact information item 122-A. Then, for example, if a snapshot 124 may be created for a later revision 134-9, this snapshot 124 includes the document identifier 120-012 because this artifact formation document 120-012 includes the latest version of the artifact information item 122-001. The same procedure may be applied to all the other artifact information items 122 which have been introduced until the revision of the snapshot 124, here until the ninth revision 134-9. Hence, one may obtain a list of document identifiers 120-ID which may indicate in which artifact documents 120 the latest version of the respective artifact information items 122 may be found up to a given revision 134-g. Therefore, a given snapshot 124 may cover a given range of revisions 134, e.g., from the first revision 134-1 up to a given revision 134-g. In some examples, the snapshot 124 may be stored as a number which may be composed of the numbers of the document identifiers 120-ID which are included by the snapshot 124.

In further examples, there may be tens or hundreds or more of thousands of revisions 134 and a respective snapshot 124 may be determined and stored, e.g., every twenty thousand revisions 134. Consequently, there may be first snapshot 124-1 covering the first revision 134-1 until the twenty thousandth revision 134-20,000, a second snapshot 124-2 covering the first revision 134-1 until the forty thousandth revision 134-40,000, a third snapshot 124-3 covering the first revision 134-1 until the sixty thousandth revision 134-60,000, etc. By way of example, the respective snapshot 124 may be stored in the data store 108.

By way of example, a respective linkage key 126 may link the respective revision 134 to the respective snapshot 124. The respective linkage key 126 may indicate, for a given revision 134-g, which of the available snapshots 124 may cover the given revision 134-g. In the context of the above example, the linkage keys 126 may indicate that the first snapshot 124-1 covers the first revision 134-1 until revision 134-20,000 via linkage key 126-1[124-1|1:20,000], the second snapshot 124-2 covers the first revision 134-1 until revision 134-40,000 via linkage key 126-2[124-2|1:40,000], the third snapshot 124-3 covers the first revision 134-1 until revision 134-60,000 via linkage key 126-3[124-3|1:60,000], etc. Hence, in some examples, the respective linkage key 126 may be understood as a sort of basket in which to look for a particular revision of interest 134-i.

In some examples, the respective document identifier 120-ID, the respective item identifier 122-ID, the respective snapshot 124 and/or the respective linkage key 126 may be stored in the data store 108. In further examples, the respective document identifier 120-ID, the respective item identifier 122-ID, the respective snapshot 124, and/or the respective linkage key 126 may be or include one or more bit sets, binary, decimal, or hexadecimal numbers, or the like. One or both of these two aspects, namely the storage in the data store 108 and the mentioned bit set or number character, may also apply to the closest lower snapshot 124c and/or the searched snapshot 124s which are explained in more detail below.

In an example embodiment, the application software component 106 and/or the processor 102 may be configured to receive a user's input corresponding to searching the respective searched artifact information item 122s at a revision of interest 134-i. By way of example, the user may provide his or her input through user interactions with the artifact information management UI 116.

In some examples, the user may directly indicate the respective searched artifact information item 122s and the revision of interest 134-i. The respective searched artifact information item 122s and the revision of interest 134-i may be extracted from the user's input, e.g., by interpreting the user's input and/or by determining which of the artifact items 122 may be the respective searched artifact information item 122s and/or which of the revisions 134 may be the revision of interest 134-i.

Herein, the respective searched artifact information item 122s at a revision of interest 134-i may be understood as the latest changes made to a specific artifact information item 122 at some point of time the user is interested in. Sometimes, these latest changes made at some point in time the user is interested in may also be called a baseline. The functionality of providing the requested information to the user may be considered as a sort of a time machine which in some ways may allow for travelling back in time to see the status at some point of time the user is interested in.

In some examples, the application software component 106 and/or the processor 102 may further be configured to determining the respective document identifier 120-ID of the respective artifact document 120 including the respective searched artifact information item 122s. As mentioned above, a respective document identifier 120-ID may be assigned to the respective artifact document 120. Further, the respective artifact document(s) 120 including the respective searched artifact information item 122s may be found so that the respective document identifier 120-ID of the respective artifact document 120 including the respective searched artifact information item 122s may be looked up and hence be determined. In some examples, the assignment of a respective artifact document 120 including a given artifact information item 122s may be stored in a list linking the respective artifact document 120 and the artifact information items 122s included by the respective artifact document 120. This list may be stored in the data store 108.

In further examples, the application software component 106 and/or the processor 102 may further be configured to determine the closest lower snapshot 124c preceding or corresponding to the revision of interest 134-i using the respective linkage key 126.

As already mentioned above, there may be several snapshots 124 in the course of the revisions 134, whereby the respective snapshot 124 may be understood as the state of a system, here, the partial or complete plurality of the artifact documents 120, the artifact information items 122 and the revisions 134, at a particular point in time, e.g., at a given revision 134-g. To facilitate finding the respective searched artifact information item 122s at the revision of interest 134-i, the closest lower snapshot 124c may be determined as the starting point, wherein the closest lower snapshot 124c either precedes the revision of interest 134-i or corresponds to the revision of interest 134-i. Hence, in some examples, a later snapshot 124 may neither be required nor used for this approach.

In the context of the above example of three snapshots 124-1, 124-2, and 124-3 with three linkage keys 126-1[124-1|1:20,000], 126-2[124-2|1:40,000], and 126-3[124-3|1:60,000], the user may search a particular artifact information item 122s at the revision of interest 134-i 38,312. Then, using the mentioned linkage keys 126, the closest lower snapshot 124c may be determined to be the snapshot 124-1 covering the first revision 134-1 until revision 134-20,000 because it precedes the revision of interest 134-i which is in this example 38,312. The snapshot 124-2 covering the first revision 134-1 until revision 134-40,000 may not fit because it does not precede (or at best correspond to) the revision of interest 134-i. Using the mentioned linkage keys 126, the determination of the closest lower snapshot 124c may be done fast and without large memory consumption.

In further examples, the application software component 106 and/or the processor 102 may further be configured to determine a searched snapshot 124s by appending to the closest lower snapshot 124c the document identifiers 120-ID of the respective artifact documents 120 of the revisions 134 from the given revision 134-g of the closest lower snapshot 124c up to the revision of interest 134-i. Herein, the searched snapshot 124s may refer to a newly determined snapshot 124 covering the first revision 134-1 until the revision of interest 134-i. In the above example of three snapshots 124-1, 124-2, and 124-3 and the revision of interest 134-i 38,312, the searched snapshot 124s may hence cover the first revision 134-1 until the revision of interest 134-i which is revision 134-38,312.

The searched snapshot 124s may be determined using the closest lower snapshot 124c as a starting point and by adding to the closest lower snapshot 124c information on the revisions between the given revision 134-g of the closest lower snapshot 124c and the revision of interest 134-i. In some examples, the added information includes the document identifiers 120-ID of the respective artifact documents 120 of the explained revisions, e.g., of the revisions between the given revision 134-g of the closest lower snapshot 124c and the revision of interest 134-i. As explained above, in some examples, the document identifiers 120-ID of the respective artifact document 120 including the latest version of the respective artifact information item 122 up to the given revision 134-g may be considered to determine the respective snapshot 124.

For further illustration, the difference between the closest lower snapshot 124c and the searched snapshot 124s is explained in the context of the above example of three snapshots 124-1, 124-2, and 124-3 and the revision of interest 134-i 38,312. The closest lower snapshot 124c may be the snapshot 124-1 covering the first revision 134-1 until revision 134-20,000 and may include the document identifiers 120-ID of the respective artifact documents 120 including the latest version of the respective artifact information item 122 up to the revision 134-20,000. Then, the document identifiers 120-ID of the respective artifact documents of the revisions 134 from the revision 134-20,000 (e.g., the given revision 134-g of the closest lower snapshot 124c) up to the revision of interest 134-i 38,312 may be determined and appended to the closest lower snapshot 124c to obtain the searched snapshot 124s.

In some examples, for the determination of the searched snapshot 124s, only the document identifiers 120-ID of the respective artifact document 120 including the latest version of the respective artifact information item 122 may be determined and/or appended to the closest lower snapshot 124c to obtain the searched snapshot 124s. This may contribute to speed up finding the respective searched artifact information item 122s at the revision of interest 134-i because necessary computation and memory consumption may be avoided.

In certain examples, there is no snapshot 124 yet for a revision of interest 134-i. This may be due to the fact that that there may be tens or hundreds or more of thousands of revisions 134 and only comparably very few snapshots 124. Hence, a user picking one particular revision 134 as the revision of interest 134-i may mean picking a revision 134 for which a snapshot 124 is not yet available. Only in very rare cases, the user may coincidentally pick a particular revision 134 for which snapshot 124 is already available. Depending on the "density" of snapshots 124, e.g., one snapshot 124 every 20,000 revisions 134, the likelihood of the user picking a particular revision 134 for which snapshot 124 is already available is very small, e.g., 1:20,000.

In further examples, the application software component 106 and/or the processor 102 may further be configured to determine the respective document identifier 120-ID of the respective artifact document 120 including the latest version of the respective searched artifact information item 122s at the revision of interest 134-i by intersecting the determined respective document identifier 120-ID of the respective artifact document 120 including the respective searched artifact information item 122s with the determined searched snapshot 124s.

In some examples, the intersection of two sets, here the respective determined document identifier 120-ID and the determined searched snapshot 124s, may be understood to be the element or set of elements which belong(s) to both sets, here to both the respective determined document identifier 120-ID and the determined searched snapshot 124s. In other words, the intersection of two sets A and B, denoted by A∩B, may include all elements that are both in A and B. For example, {1,2}∩{2,3}={2}. As mentioned above, the respective determined document identifier 120-ID and the determined searched snapshot 124s may be one or more bit sets, binary, decimal, or hexadecimal numbers, or the like. Because intersecting such quantities, e.g., two binary numbers, may be a very fast and efficient computation operation, the respective document identifier 120-ID of the respective searched artifact information item 122s at the revision of interest 134-i may be determined requiring comparably small computation or memory resources. In some examples, this very fast and efficient intersection operation is even possible for large amounts of data involved, e.g., tens or hundreds or more of thousands of revisions 134, respective artifact documents 120 and/or respective artifact information items 122.

Using the mentioned intersection, the respective document identifier 120-ID of the respective searched artifact information item 122s at the revision of interest 134-i may be determined. In some examples, this determined respective document identifier 120-ID may be the key to answer the user's search query. The determined respective document identifier 120-ID may allow to directly access the corresponding artifact information document 120 which may include the latest version of the respective searched artifact information item 122s at the revision of interest 134-i.

In further examples, the application software component 106 and/or the processor 102 may further be configured to display information 128 relating to the respective searched artifact information item 122s at the revision of interest 134-i using the respective artifact document 120 corresponding to the determined respective document identifier 120-ID to the user via an artifact information management user interface (UI) 116.

Herein, in some examples, the displayed information 128 may directly relate to the respective searched artifact information item 122s at the revision of interest 134-i and may therefore directly answer the user's search input which has been received as described above. By way of example, the displayed information 128 may include bibliographic, statistic or numeric information with respect to the respective searched artifact information item 122s. Further details of such displayed information 128 are explained in more detail below.

The displayed information 128 may be of great value for the user, e.g., to find out or understand which amendment to the artifact information has been made when by who and why. Such information may be very useful for bug fixing purposes when a new product is created including the requirements engineering of the new product. The product creation may include an ideation, a design, and a manufacturing phase which may each be described or characterized by corresponding artifact information. Further, several industries, like the aviation industry, need to comply with extensive requirements with respect to tracking and traceability of each and every part to have a complete chain of evidence which is needed to trust the development and production of parts, e.g., of aircraft parts. In this context, the user may want to find all the relevant information with respect to certain product features, requirements, etc., which may be included by the artifact information, more specifically by the artifact information item 122s the user may search. By providing the displayed information 128 to the user, the user may quickly and conveniently find information relevant to the user's search query and allow the user to fulfill the user's business need, e.g., to find out when a particular property of a product part has been introduced to the artifact information in the form of the searched artifact information item 122s. Further, using the displayed information 128, the user may continue creating or amending artifact information, e.g., with respect to one or more of the artifact information items 122, the artifact documents 120 and/or the revisions 134, e.g., to further the develop requirements of a product to be ideated, designed, and then produced.

In some examples, finding the respective searched artifact information item 122s at a revision of interest 134-i may be challenging and highly non-trivial due to the large number of artifact information items 122, artifact documents 120 or revisions 134. This may particularly be the case if only the latest version of the respective searched artifact information item is of interest to the user. Using standard available computation and memory resources, e.g., of a state-of-the-art server, notebook or desktop computer, finding the respective searched artifact information item 122s at the revision of interest 134-i using to the suggested method may successfully be completed in a relatively short time which may still be acceptable for users. For example, finding the respective searched artifact information item 122s at the revision of interest 134-i according to the suggested method may only take a few seconds and may almost be independent of the amount data to be searched which may be a major improvement.

According to other approaches, in contrast, the user may need to wait for minutes, or a timeout may occur, e.g., the search query may be abandoned without providing a result to the user, which is clearly not convenient and not acceptable for the user. Consequently, in many cases, users of the other approaches regularly complain about the too long processing time of the search query, whereas there may practically be no more complaints of users of the suggested finding method.

In further examples, the displayed information 128 may include the respective searched artifact information item 122s at the revision of interest 134-i and/or the displayed information 128 may include the respective artifact document 120 corresponding to the determined respective document identifier 120-ID including the latest version of the respective searched artifact information item 122s at the revision of interest 134-i.

By displaying the respective searched artifact information item 122s at the revision of interest 134-i to the user, the user's search query may directly be answered and fulfilled. The user may see the content of respective searched artifact information item 122s at the revision of interest 134-i that the user was looking for.

By displaying the respective artifact document 120 corresponding to the determined respective document identifier 120-ID including the latest version of the respective searched artifact information item 122s at the revision of interest 134-i to the user, the user may obtain additional information on the respective searched artifact information item 122s. This additional information may include the context in which the respective searched artifact information item 122s may be used or to which other artifact information items 122 the respective searched artifact information item 122s may relate and of what kind this relation may be.

In some examples, using one or both of these two scenarios, the displayed information 128 including the respective searched artifact information item 122s at the revision of interest 134-i and/or the respective artifact document 120, the user may quickly and conveniently find information relevant to the user's search query and allow the user to fulfill the user's business need as already mentioned above, e.g., to further the develop requirements of a product to be ideated, designed and then produced.

In some examples, the closest lower snapshot 124c may correspond to the revision of interest 134-i, wherein the application software component 106 and/or the processor 102 may further be configured to determine the searched snapshot 124s to be the closest lower snapshot 124c.

As already explained above, the likelihood of the user picking a particular revision 134 for which snapshot 124 is already available is very small, e.g., 1:20,000. Nonetheless, it may happen that the user is interested in a revision of interest 134-i for which a snapshot 124 is directly available. In such a rather rare case, the above-mentioned closest lower snapshot 124c may directly correspond to the revision of interest 134-i so that the searched snapshot 124s may be determined to be the closest lower snapshot 124c. Hence, in these rare cases, the searched snapshot 124s does not need to be determined by appending to the closest lower snapshot 124c the document identifiers 120-ID of the respective artifact documents 120 of the revisions 134 from the given revision 134-g of the closest lower snapshot 124c up to the revision of interest 134-i because the given revision 134-g coincides with the revision of interest 134-i.

In some examples, the respective artifact information item 122 may be characterized by respective item metadata 130, wherein the application software component 106 and/or the processor 102 may further be configured to receive the user's input corresponding to a specification of item metadata of interest 130-i; and to determine the respective searched artifact information item 122s at the revision of interest 134-i using the received specification of item metadata of interest 130-i.

In some examples, the respective item metadata 130 may describe or provide information about the respective artifact information item 122. By way of example, the respective item metadata 130 may include one or more of the following types of metadata with respect to the respective artifact information item 122. For example, the item metadata 130 may include descriptive metadata, such as the descriptive information which may be used for discovery and identification and which may include elements such as title, abstract, author, and keywords. In another example, the item metadata 130 may include structural metadata, such as metadata about containers of data which may indicates how compound objects are put together, related or structured, e.g., how artifact information items 122 may be ordered to form chapters of requirements, to describe different aspects of a (component) of a product, etc. In another example, the item metadata 130 may include administrative metadata, such as information allowing to manage the respective artifact information item 122, like the item type, permissions, and when and how it was created. In another example, the item metadata 130 may include reference metadata, such as the information about the contents and quality of statistical data. In another example, the item metadata 130 may include statistical metadata, also called process data, which may describe processes that collect, process, or produce statistical data. In another example, the item metadata 130 may include legal metadata, such as information about the creator, copyright holder, and public licensing, if provided.

In some examples, the user may input a specification of item metadata of interest 130-i, which may correspond to searching the respective artifact information items 122 with particular descriptive metadata or legal metadata of interest. For example, the user may particularly be interested in respective artifact information items 122, which have been created by another user or which have certain keywords. Hence, the specification of item metadata of interest 130-i may correspond, in some examples, to a certain creator or certain keywords of the respective artifact information item 122.

Using the received user's input indicating the specification of item metadata of interest 130-i, one or more corresponding searched artifact information items 122s may be determined at the revision of interest 134-i.

In some examples, the respective item metadata 130 may be stored in the data store 108. Further, the respective item metadata 130 may be attached or appended to the corresponding, respective artifact information item 122. In further examples, the respective item metadata 130 may be stored in the respective snapshot 124. In yet further examples, the respective item metadata 130 may be stored in the list along with the corresponding, respective artifact information items 122, whereby the list may be used to retrieve corresponding, respective searched artifact information items 122 which comply with the received specification of item metadata of interest 130-i. For example, using the mentioned list, the respective searched artifact information item 122 may be determined which may then be used to carry out the suggested method of finding a respective searched artifact information item 122s in a plurality of thousands of artifact documents 120.

Hereby, in some examples, the user may not necessarily be required to directly indicate the revision of interest 134-i in the user's search query or input corresponding to searching the respective searched artifact information item 122s at the revision of interest 134-i. Rather, the user may provide input corresponding to a specification of item metadata of interest 130-i, which may then be used to determine the revision(s) of interest 134-i and optionally the respective searched artifact information item 122s.

Correspondingly, in some examples, the user may not necessarily be required to directly indicate the respective searched artifact information item 122s in his or her search query or input corresponding to searching the respective searched artifact information item 122s at the revision of interest 134-i. Rather, the user may provide input corresponding to a specification of item metadata of interest 130-i, which may then be used to determine the respective searched artifact information item 122s and optionally the revision(s) of interest 134-i.

In some examples, the item metadata of interest 130-i may relate to a severity level of the respective artifact information item 122 and/or the item metadata of interest 130-i may relate to at least one of a specific creation date of the respective artifact information item 122, a specific time period of creation of the respective artifact information item 122, a specific revision of interest 134-i or range of specific revisions of interest 134-i, or any combination thereof.

The item metadata 130 may further include severity levels, such as "must have", "critical", "major", "blocker", "normal", "nice to have", "minor", "trivial", "basic", etc. In these examples, the user may provide his or her input corresponding to a specification of item metadata of interest 130-i indicating one or more of such security levels. One or more corresponding, searched artifact information items 122s may then be determined at the revision of interest 134-i which correspond to the received indication of the security level(s) of interest.

By way of example, the item metadata of interest 130-i may relate to a specific creation date or creation time period, revision of interest 134-i or range of revisions of interest 134-i. The user may then, e.g., provide his or her input corresponding to a specification of item metadata of interest 130-*i* indicating a specific creation time period, e.g., during the last week or month, or a specific range of revisions of interest 134-*i*, e.g., revisions 12,000 to 15,000. One or more corresponding, searched artifact information items 122*s* may then be determined at the revision(s) of interest 134-*i* which correspond to the received indication of the specific creation time period or the specific range of revisions of interest 134-*i*.

In some examples, the displayed information 128 may include the number 132 of the respective searched artifact information items 122*s* at the revision of interest 134-*i* complying with the received user's input, wherein the application software component 106 and/or the processor 102 may further be configured to determine the number 132 of the respective searched artifact information items 122*s* complying with the received user's input; and to display the information 128 including the determined number 132 of the respective searched artifact information items 122*s* to the user via the artifact information management UI 116, optionally as a function of the received specification of item metadata of interest 130-*i* and/or as a function of time.

In some examples, the mentioned received user's input may be the above-mentioned received user's input corresponding to searching the respective searched artifact information item 122*s* at a revision of interest 134-*i* and/or the above-mentioned received user's input corresponding to a specification of item metadata of interest 130-*i*.

By way of example, one or several searched artifact information items 122*s* may comply with the received user's input. In some examples, the number 132 of the respective searched artifact information items 122*s* complying with the received user's input may be determined and displayed to the user via the artifact information management UI 116. Herein, the determined number 132 may be displayed to the user along with other data or information included by the displayed information 128, such as some of the above-mentioned metadata 130, e.g., the mentioned severity level, the mentioned creation date or the specific revision of interest 134-*i*. In further examples, the displayed information 128 includes only the determined number 132.

The displayed information 128 may be displayed via the artifact information management UI 116 as a graph, e.g., such that the determined number 132 may be displayed along the y-axis as a function of some specific metadata, e.g., the mentioned severity level, the mentioned creation date mentioned and/or the specific revision of interest 134-*i*, which may be displayed along the x-axis. Further, displaying the determined number 132 of the respective searched artifact information items 122*s* with a specific severity level as a function of the mentioned creation date may allow the user to quickly perceive changes with respect to the quality or the progress of the work on the artifact information over time.

In further examples, the determined number 128 may reflect changes made to the respective searched artifact information item 122*s* over several revisions 134 or snapshots 124, whereby this determined number 128 may then be displayed as a function of the revisions 134 or snapshots 124.

Further types of display of the determined number 132 may include a pie chart, bar chart or the like in which the determined number 128 is displayed, e.g., as a function of the mentioned item metadata 130.

In further examples, the application software component 106 and/or the processor 102 may further be configured to determine the respective snapshot 124 and optionally the respective linkage key 126 prior to receiving the user's input corresponding to searching the respective searched artifact information item 122*s* at the revision of interest 134-*i*. In some examples, the respective snapshot 124 may be determined using the respective item identifier 122-ID of the respective artifact information item 122.

In some examples, determining the respective snapshot 124 may computationally be complex or require a considerable amount of computation and memory resources. In such examples, the respective snapshot may be determined prior to or before receiving the user's input or search query. This approach may considerably accelerate finding the respective searched artifact information item 122*s* at the revision of interest 134-*i* and may hence considerably accelerate answering a user's search query because more time-consuming preparatory computation tasks may be done beforehand so that the results of these preparatory computation task may already be available when the user's search query is received. In further examples, a similar approach may also be applied for similar reasons to the respective linkage key 126 to further accelerate finding the respective searched artifact information item 122*s* at the revision of interest 134-*i*.

In some examples, the respective snapshot 124 and/or the searched snapshot 124*s* may be determined using a Java library or a Lucene library, e.g., to create a corresponding bit set. Herein, Java is a high-level, class-based, object-oriented programming language and Apache Lucene is a free and open-source search engine software library, originally written in Java.

In further examples, the respective document identifier 120-ID may be assigned to the respective the artifact document 120, and the respective item identifier 122-ID may be assigned to the respective artifact information item 122 prior to receiving the user's input corresponding to searching the respective searched artifact information item 122*s* at the revision of interest 134-*i*.

In further examples, the application software component 106 and/or the processor 102 may further be configured to determine the respective snapshot 124 and optionally the respective linkage key 126 periodically, optionally taking into account the computation and memory resources available or required to determine at least one of the respective snapshot 124, the respective linkage key 126, the respective document identifier 120-ID of the respective searched artifact information item 122*s*, or any combination thereof.

To consistently accelerate finding the respective searched artifact information item 122*s* at the revision of interest 134-*i*, the respective snapshot 124 and optionally the respective linkage key 126 may be determined periodically, e.g., once per hour, day, or week, or each fixed number of revisions 134, (such every thousand or every ten thousand revisions 134). This approach may make sure that the respective snapshot 124 and optionally the respective linkage key regularly may already be available before the user's search query is received.

Further, determining the respective snapshot 124 and optionally the respective linkage key 126 periodically may contribute to reduce the computational efforts for the determination of the searched snapshot 124*s* that may be obtained, as explained above, by appending to the closest lower snapshot 124*c* the document identifiers 120-ID of the respective artifact documents 120 of the revisions 134 from the given revision 134-*g* of the closest lower snapshot 124*c* up to the revision of interest 134-*i*. This may be possible because the number of revisions yet to be considered for the searched snapshot 124*s* between the given revision 134-*g* of the closest lower snapshot 124*c* up to the revision of interest 134-*i* may be reduced. Consequently, the suggested refinement may reduce the computational efforts needed to determine the searched snapshot 124*s* that is regularly determined after receiving the user's search query. Therefore, the suggested refinement may further accelerate finding the respective searched artifact information item 122*s* at the revision of interest 134-*i* and hence may reduce the waiting time of the user to get the answer to his or her search query.

Optionally, the period or frequency of the determination of the respective snapshot 124 and optionally of the respective linkage key 126 may depend on the computation and memory resources to determine the respective snapshot 124, the respective linkage key 126, and/or the respective document identifier 120-ID of the respective searched artifact information item 122*s*. In some examples, the mentioned respective snapshot 124 may include samples of searched snapshots 124*s* that might be required to answer sample user search queries, which, may relate to the revision of interest 134-*i*, which is as remote as possible from the given revision 134-*g* of the respective closest lower snapshot 124*c*. Such a sample of a searched snapshot 124*s* may be used to determine worst-case scenarios for which the largest possible number of revisions 134 needs to be considered to determine the searched snapshot 124*s*. By way of example, if such a worst-case scenario results in too long processing times and hence too long waiting times for the user waiting for the answer to his or her search query, then the period or frequency of the determination of the respective snapshot 124 and optionally of the respective linkage key 126 may be amended and, by way of example, a higher frequency resulting in shorter, still acceptable processing and waiting times, may be chosen.

Further, by way of example, the period or frequency of the determination of the respective snapshot 124 and optionally of the respective linkage key 126 may depend on the size of the file of the determined respective snapshot 124. For example, if the file size of the respective snapshot 124 and optionally of the respective linkage key 126 requires large amounts of memory or disk space, the frequency of the mentioned determination may be reduced to save memory or disk space.

In further examples, the available computation or memory resources may be taken into account to determine a suitable period or frequency of the determination of the respective snapshot 124 and optionally of the respective linkage key 126. For example, during the nights or the weekend, plenty of computation or memory resources may be away level, whereas during regular working hours, the available computation or memory resources may be much more limited. In some examples, the period or frequency of the determination of the respective snapshot 124 and optionally of the respective linkage key 126 may therefore configured to such patterns and the mentioned determination may be done during the night or at the weekend.

In some examples, the application software component 106 and/or the processor 102 may further be configured to determine the searched snapshot 124*s* by appending to the closest lower snapshot 124*c* the respective document identifier 120-ID of the respective artifact document 120 including the latest version of the respective searched artifact information item 122*s* of the revisions 134 from the given revision 134-*g* of the closest lower snapshot 124*c* up to the revision of interest 134-*i*.

To further accelerate finding the respective searched artifact information item 122*s* at the revision of interest 134-*i*, the document identifier 120-ID of the respective artifact document 120 including the latest version of the respective searched artifact information item 122 may be determined and appended to the closest lower snapshot 124*c* to obtain the searched snapshot 124*s*. Herein, in some examples, only the respective searched artifact information item 122 may be taken into account and other artifact information items 122 may be ignored, which may result in relatively few computation acts to be carried out to obtain the searched snapshot 124*s*. This approach may accelerate finding the respective searched artifact information item 122*s* at the revision of interest 134-*i* and unnecessary computation and memory consumption may be avoided.

In further examples, the application software component 106 and/or the processor 102 may further be configured to determine the respective snapshot 124 taking into account only revisions 134 back to the previous snapshot 124.

In these further examples, if the previous snapshot 124 may relate to a certain revision 134, then the respective snapshot 124 may be determined taking into account only the revisions 134 between this certain revision 134 of the previous snapshot and the given revision 134-*g* of the respective snapshot 124 currently to be determined, whereby the given revision 134-*g* may be included. Hence, by way of example, if the previous snapshot 124 may relates to the 10,000th revision 134-10,000 and the present snapshot 124 shall be determined for the 20,000th revision 134-20,000, then the revisions 10,001, 10,002, up to 20,000 may be considered to determine the present snapshot 124.

In some examples, each snapshot 124 may be determined accordingly, e.g., only taking into account revisions 134 back to the respective previous snapshot 124. In some examples, the searched snapshot 124*s* may then be determined by determining a complete closest lower snapshot 124*cc* and by then appending the respective artifact documents 120 of the revisions 134 from the given revision 134-*g* of the complete closest lower snapshot 124*cc* up to the revision of interest 134-*i*, wherein the complete closest lower snapshot 124*cc* may be determined by appending to the closest lower snapshot 124*c* all previous, respective snapshots 124.

In further examples, the content of the respective previous snapshot 124 or all previous snapshots 124 may also be taken into account to determine the respective present snapshot 124 which may allow to have the overview of all the available revisions 134.

This approach may accelerate determining the respective snapshot 124, which may also accelerate finding the respective searched artifact information item 122*s* at the revision of interest 134-*i*. In some examples, this approach may avoid unnecessary computation and memory consumption to determine the respective snapshot 124 and eventually to find the respective searched artifact information item 122*s* at the revision of interest 134-*i*.

In further examples, the application software component 106 and/or the processor 102 may further be configured to: determine at least one merge action 140 available for merging the respective searched artifact information item 122*s* with another artifact information item 142; display the determined at least one merge action 140 in the artifact information management UI 116; capture a user's input corresponding to a selection of one of the displayed at least one merge action 140 in response to user interactions with the artifact information management UI 116; and create a respective amended artifact information item 144 by merging the respective searched artifact information item 122*s* with the other artifact information item 142 according to the selected merge action 140.

By way of example, the artifact document 120 including the respective searched artifact information item 122s may be included by a first artifact document 120-1 and the other artifact information item 142 may be included by a second artifact document 120-2. In some examples, the respective merge action 140 may be an "insert" merge action for which the respective searched artifact information item 122s (or the other artifact information item 142) may be inserted as an artifact information item 122, e.g., in the second artifact document 120 (or the first artifact document 120-1, respectively). In further examples, the respective merge action 140 may be a "replace" merge action for which the respective searched artifact information item 122s (or the other artifact information item 142) may be replaced with the other artifact information item 142 (or the respective searched artifact information item 122s) in the second artifact document 120 (or the first artifact document 120-1, respectively). In some examples, the respective merge action 140 may be a "discard" merge action for which the other artifact information item 142 (or the respective searched artifact information item 122s) may discarded or ignored, e.g., the other artifact information item 142 (or the respective searched artifact information item 122s) may not be inserted as an additional artifact information item 122 in the first artifact document 120-1 (or the second artifact document 120-2, respectively). By way of example, the respective merge action 140 may be a "reference" merge action for which the respective searched artifact information item 122s (or the other artifact information item 142) may reference to the other artifact information item 142 (or the respective searched artifact information item 122s) in the second artifact document 120-2 (or the first artifact document 120-1, respectively). This reference merge action 140 may be a special type of insert merge action 140 for which a reference to the other artifact information item 142 (or the respective searched artifact information item 122s) included by the second artifact document 120-2 (or the first artifact document 120-1) is inserted as an additional artifact information item 122 into the first artifact document 120-1 (or the second artifact document 120-2, respectively). The reference merge action 140 may be helpful when, e.g., the first artifact document 120-1 is a master artifact document and the second artifact document 120-2 is a branch artifact document including more recent artifact information items 122 which shall be introduced or merged into the master document. In the above, the alternative in parenthesis may relate to the case that the second artifact document 120 is the master document and the first artifact document 120-1 is the branch document. Further, the alternative without parenthesis may relate to the case that the first artifact document 120-1 is the master document and the second artifact document 120 is the branch document.

The mentioned referencing may be realized as a live reference or as a frozen reference. A live reference may be particularly useful for incorporating future additional amendments in the artifact information of a branch artifact document (e.g., new or amended other artifact information item 142 included by the second artifact document 120) into an updated and up-to-date version of the master artifact document (e.g., the first artifact document 120-1). A frozen reference may be used for incorporating current amendments in the artifact information of a branch artifact document (e.g., the other artifact information item 142 included by the second artifact document 120-2) into the master artifact document (e.g., the first artifact document 120-1), wherein future amendments of the branch document shall not automatically be incorporated into the master document.

In further examples, the at least one merge action 140 available to a user may depend on at least one of a user status, a user security, an authentication status an artifact document status, or any combination thereof. Correspondingly, only those merge actions 140 may be displayed which are available to a specific user. This may allow for a security concept which is configured to different user groups, such as administrators having full permission, regular uses having restricted permission and guests having minimum permission to amend, and in particular to delete, artifact information of the considered artifact document 120. The available merge actions 140 may only be available if the respective user has correctly authenticated which improves security of the respective handled artifact document 120. The available merge actions 140 may only include predefined merge actions 140 which may depend on the artifact document status, so that, e.g., references are only allowed from a branch document to a master document and not vice versa.

In an example embodiment, the application software component 106 and/or the processor 102 may further be configured to display the determined at least one merge action 140 in the artifact information management UI 116. Further, the application software component 106 and/or the processor 102 may further be configured to capture a user's input corresponding to a selection of one of the displayed at least one merge action 140 in response to user interactions with the artifact information management UI 116.

Displaying the determined, respective merge action 140 in the artifact information management UI 116 may allow the user to get an overview of the available merge actions 140 for the respective searched artifact information item 122s and the other artifact information item 142. The user may then select one of the displayed, available merge actions 140, e.g., by clicking on the desired displayed merge action 140. In some examples, the respective searched artifact information item 122s and the other artifact information item 142 may be displayed to the user along with the determined respective merge action 140.

In further examples, the application software component 106 and/or the processor 102 may further be configured to create a respective amended artifact information item 144 by merging the respective searched artifact information item 122s and the other artifact information item 142. For the creation of the respective amended artifact information item 144, the respective searched artifact information item 122s and the other artifact information item 142 may be merged according to the respective merge action 140 which has been selected by the user. The selected merge action 140 may be one of the above-explained insert, replace, discard, or reference merge actions 140, wherein the respective searched artifact information item 122s and the other artifact information item 142 are processed accordingly to create the amended artifact information item 144. For the example of the discard merge action 140, the respective amended artifact information item 144 may be equal to the respective searched artifact information item 122s.

By way of example, the respective searched artifact information item 122s and optionally the respective first artifact document 120-1 (or parts of it) may be displayed in a first box in the artifact information UI 116. Further, the other artifact information item 142 and optionally the respective second artifact document 120 (or parts of it) may be displayed in a second box in the artifact information UI 116. The available merge action 140 may be displayed in a third box, e.g., a merge bar, in the artifact information UI 116.

In further examples, the created amended artifact information item 144 may then be stored in a new artifact document 120-*n* assigned to a new revision 134-*n*, which may be stored in the data store 108. In some examples, the created amended artifact information item 144 may be stored as a newer version of the respective searched artifact information item 122s.

In some examples, the suggested method of finding the respective searched artifact in-formation item 122s in a plurality of thousands of artifact documents 120 may only take a few seconds and may almost be independent of the amount data to be searched which may be a major improvement. This may particularly be the case if only the latest version of the respective searched artifact information item is of interest to the user. Contrary to other approaches, there may practically be no more complaints from users of the suggested method.

Further, the described application software component 106 and/or the processor 102 may carry out an analogous method of managing artifact information, especially of finding the respective searched artifact information item 122s in a plurality of thousands of artifact documents 120.

Further, a computer-readable medium 160, which may include a computer program product 162, is shown in FIG. 1, wherein the computer program product 162 may be encoded with executable instructions, that when executed, cause the computer system 100 or and/or the artifact information management system 118 to carry out the described method.

Figure 2:
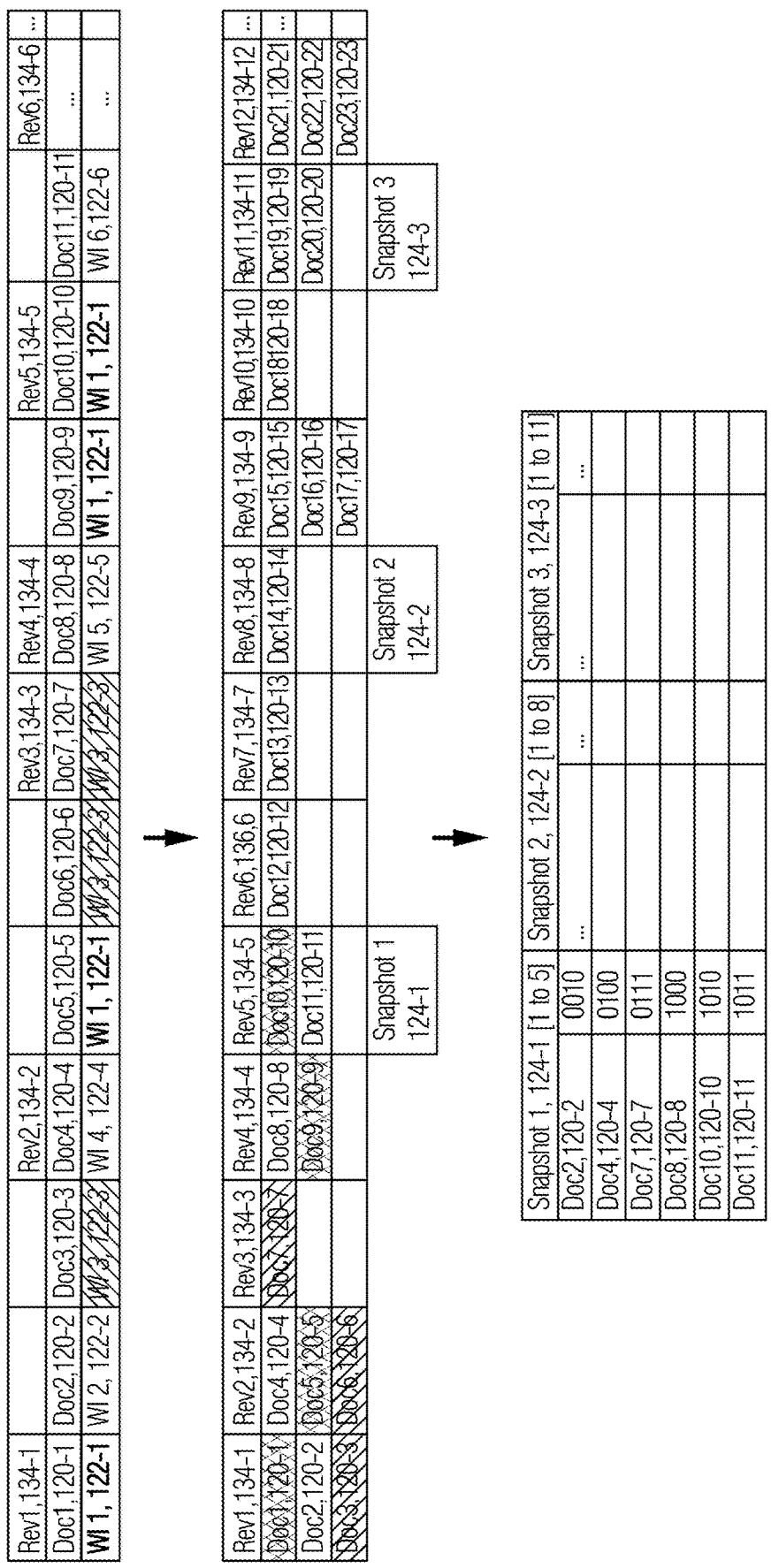

With reference to FIG. 2, a first flow diagram of a first example methodology that facilitates managing artifact information in a product system 100 is illustrated.

First, as illustrated in the top third of FIG. 2, an overview of several revisions 134 is provided, wherein one or more artifact documents 120 including one or more artifact information items 122 may be assigned to the respective revision 134. For example, the artifact documents Doc 1 with the document identifier 120-1, Doc 2 with the document identifier 120-2, and Doc 3 with the document identifier 120-3 may be assigned to the first revision Rev 1, 134-1. The artifact document Doc 1 may include the artifact information item WI 1 with the item identifier 122-1, the artifact document Doc 2 may include the artifact information item WI 2 with the item identifier 122-2, and the artifact document Doc 3 may include the artifact information item WI 3 with the item identifier 122-3. Further, the artifact documents Doc 4 with the document identifier 120-4, Doc 5 with the document identifier 120-5, and Doc 6 with the document identifier 120-6 may be assigned to the second revision Rev 2, 134-2. The artifact document Doc 4 may include the artifact information item WI 4 with the item identifier 122-4, the artifact document Doc 5 may include the artifact information item WI 1 with the item identifier 122-1 (e.g., an amended version of the artifact information item WI 1), and the artifact document Doc 6 may include the artifact information item WI 3 with the item identifier 122-3 (e.g., an amended version of the artifact information item WI 2).

The artifact document Doc 5 includes the artifact information item WI 1 with the item identifier 122-1, which was already included by the artifact document Doc 1 with the document identifier 120-1. This aspect is highlighted in FIG. 2 using bold letters and with a grey box. By way of example, in the second revision Rev 1, 134-2, some amendments may have been made to the artifact information item WI 1 which is then stored in the artifact document Doc 5. This may analogously apply to the artifact information item WI 3 with the item identifier 122-3 which is both included by the artifact document Doc 3 and the artifact document Doc 6. This aspect is highlighted in FIG. 2 using italic letters and with a grey box.

By way of example, let us assume that the artifact information item WI 1, 122-1 has the title "hello". Further, let us assume that the artifact information items WI 5, 122-5 and WI 8, 122-8 have the title "hello", respectively, wherein the artifact information items WI 5, 122-5 and WI 8, 122-8 may else not be related to the artifact information item WI 1, 122-1 or to each other. Further, it is assumed that the artifact information item WI 5, 122-5 is included by the artifact document Doc 8 with the document identifier 120-8 (as illustrated in the top third of FIG. 2) and that the artifact information item WI 8, 122-8 is included by the artifact document Doc 12 with the document identifier 120-12.

Second, as illustrated in the center third of FIG. 2, a snapshot 124-1 of the revision 134-5, a snapshot 124-2 of the revision 134-8, and a snapshot 124-3 of the revision 134-11 may be determined or be provided. Herein, the respective snapshot 124 of a given revision 134-*g* includes the document identifiers 120-ID of the respective artifact documents 120 including the latest version of the respective artifact information item 122 up to the given revision 134-1, 134-2, . . . , 134-*g*.

Third, as illustrated in the bottom third of FIG. 2, the snapshot 1, 124-1 may cover the revisions 1 to 5 (e.g., the first revision Rev 1, 134-1 to the fifth revision Rev 5, 134-5). Hereby, the snapshot 1, 124-1 may include the artifact documents Doc 2, 120-2, Doc 4, 120-4, Doc 7, 120-7, Doc 8, 120-8, Doc 10, 120-10, and Doc 11, 120-11 as each of these artifact documents 120 includes the latest version of the artifact information items 122 up to the fifth revision Rev 5, 134-5. The other artifact documents Doc 1, 120-1, Doc 3, 120-3, Doc 4, 120-4, Doc 5, 120-5, and Doc 9, 120-9 which are also included by the revisions 134 from the first revision Rev 1, 134-1 to the fifth revision Rev 5, 134-5 are, however, not included by the snapshot 1, 124-1 because they only include artifact information items 122 of which a later version is available until the fifth revision Rev 5, respectively.

In some examples, the respective document identifier 122-ID may then be converted into one or more bit sets, binary, decimal or hexadecimal numbers or the like. As illustrated in the bottom third of FIG. 2, a binary conversion may be applied so that the document identifier 120-2 of the document Doc 2 may result in the bit set 0010 (corresponding to the number 2), the document identifier 120-4 of the document Doc 4 may result in the bit set 0100 (corresponding to the number 4), and so on. This may result in a bit set representing the respective snapshot 124.

This may analogously be applied to the other snapshots 124, e.g., the snapshot 2, 124-2 which may cover the revisions 1 to 8, the snapshot 3, 124-3 which may cover the revisions 1 to 11, etc.

The flow diagram of the first example methodology may then continue as illustrated in FIG. 3 and as explained below.

With reference to FIG. 3, a second flow diagram of the first example methodology that facilitates managing artifact information in a product system 100 is illustrated. Hence, the flow diagram of the first example methodology may first include the three flow items illustrated in FIG. 2 and as explained above.

Fourth, a respective linkage key 126 may be determined or be provided, wherein the respective linkage key 126 may link the respective revision 134 to the respective snapshot 124. For example, the linkage key 126-1 links the revisions Rev 1, 134-1 to Rev 5, 134-5 to the snapshot 1, 124-1. The respective linkage key 126 may include the one or more bit sets representing the respective snapshot 124 as mentioned above.

Fifth, user input may be received which may correspond to searching the searched artifact information item 122s that, in the present example, may be characterized by its title "hello", at seventh revision Rev 7, 134-7.

Sixth, the document identifier(s) 120-ID of the artifact document(s) 120 including the searched artifact information item 122s may be determined. In the present example, assuming that the title "hello" of the artifact information items WI 1, 122-1, WI 8, 122-8, and WI 20, 122-20 have not been amended in the meantime, the result of this determination may be: 120-1 (because the artifact document Doc 1, 120-1 includes the artifact information item WI 1, 122-1), 120-5, 120-9, 120-10, and 120-8, 120-12 (because the artifact document Doc 8, 120-8 includes the artifact information item WI 5, 122-8 and the artifact document Doc 12, 120-12 includes the artifact information item WI 8, 122-8).

Seventh, the closest lower snapshot 124c may be determined preceding or corresponding to the revision of interest 134-i using the respective linkage key 126. In the present example, the revision of interest 134-i is the seventh revision Rev 7, 134-7, whereby the linkage keys 126-1 and 126-2 may indicate that the closest lower snapshot 124c may be snapshot 1, 124-1.

Eighth, the searched snapshot 124s may be determined by appending to the closest lower snapshot 124c the document identifiers 120-ID of the artifact documents 120 of the revisions 134 from the given revision 134-g of the closest lower snapshot 124c up to the revision of interest 134-i. As illustrated in the center third of FIG. 2, the artifact documents Doc 12, 120-12 and Doc 13, 120-13 are assigned to the revisions Rev 6, 134-6 and Rev 7, 134-7 so that the corresponding artifact document identifiers 120-12 and 120-13 (or after binary conversion the bit sets 1100 and 1101) may be appended to the closest lower snapshot 124c, here snapshot 1, 124-1.

Ninth, the determined document identifiers 120-ID (here: 0001 0101 1001 1010 1000 1100) of the respective artifact document 120 including the respective searched artifact information item 122s may be intersected with the determined searched snapshot 124s (0010 0100 0111 1000 1010 1011 1100 1101). This intersection corresponds to determining the document identifiers 120-ID of the respective artifact document 120 including the latest version of the respective searched artifact information item 122s at the revision of interest 134-i, here revision Rev 7, 134-7. In the present example, this intersection (0001 0101 1001 1010 1000 100)∩(0010 0100 0111 1000 1010 1011 1100 1101) returns (displayed in the final table in FIG. 3) (1010 1000 1100): 1010 (e.g., artifact document Doc 10, 120-10), 1000 (e.g., artifact document Doc 8, 120-8), and 1100 (e.g., artifact document Doc 12, 120-12).

Information 128 relating to the respective searched artifact information item 122s at the revision of interest 134-i and hence relating the result of the explained intersection may then be displayed to the user via the artifact information management UI 116.

Figure 4:
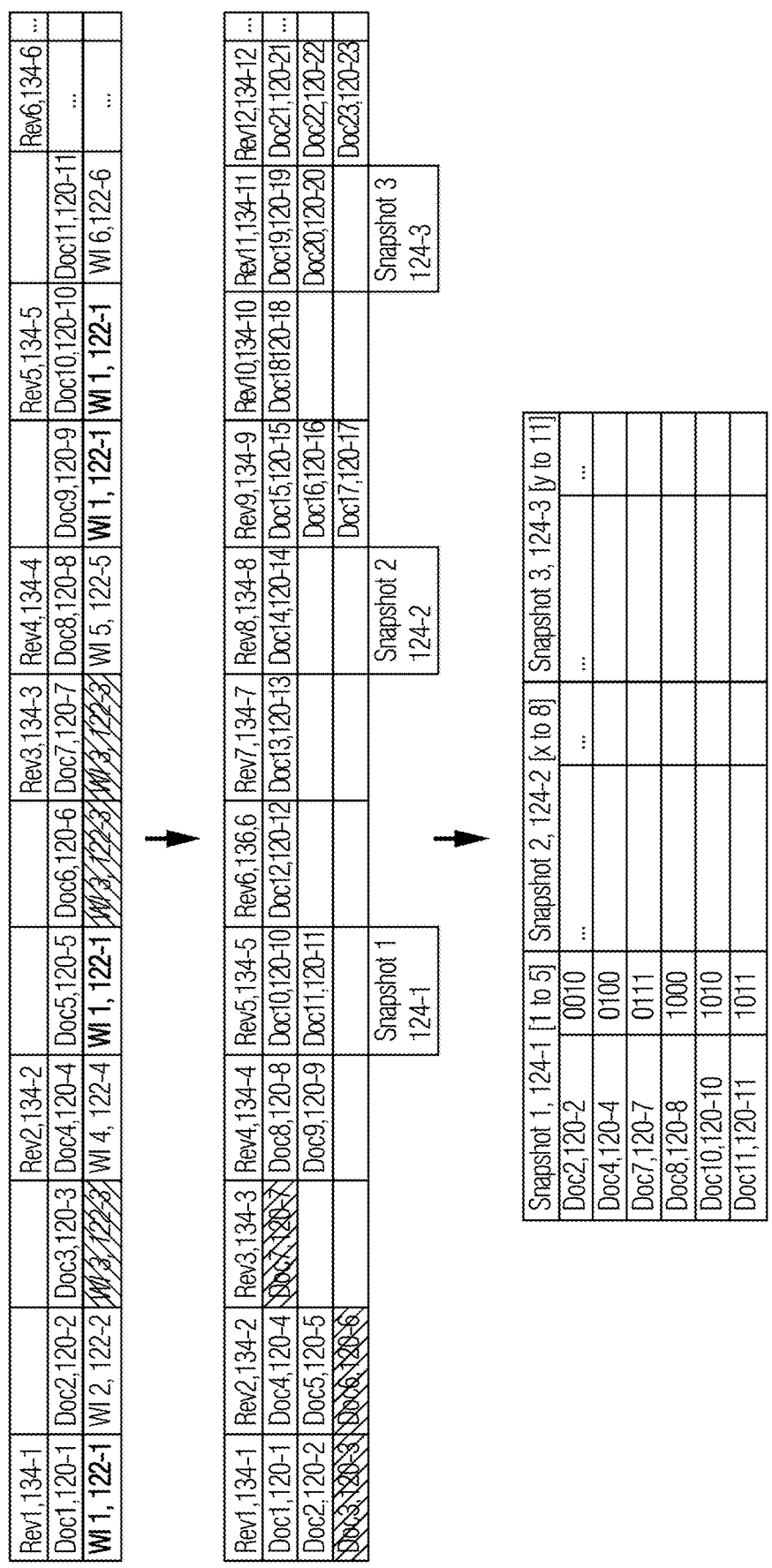

With reference to FIG. 4, a flow diagram of a second example methodology that facilitates managing artifact information in a product system 100 is illustrated.

The second example methodology may include the same two blocks which are illustrated in the top and center thirds of FIG. 2 and explained above in the context of the first example methodology.

However, according to the second example methodology, the respective snapshot 124 may be determined taking into account only revisions 134 back to the previous snapshot 124. In the present example, this may mean that the snapshot 2, 124-4 may include the document identifiers 120-ID of the respective artifact documents 120 including the latest version of the respective artifact information item 122 from the revision 134 of the previous snapshot 124 up to the given revision 134. In some examples, the revision 134 of the previous snapshot 124 may be the starting point for the next snapshot 124, and in other examples, the revision 134 following the revision 134 of the previous snapshot 124 may be the starting point for the next snapshot 124. Accordingly, the snapshot 2, 124-4 may in some examples cover the revisions Rev 6, 134-6, Rev 7, 134-7, and Rev 8, 134-8 and may in other examples cover the revisions Rev 5, 134-5, Rev 6, 134-6, Rev 7, 134-7, and Rev 8, 134-8.

Hence, as illustrated in the bottom third of FIG. 4, the snapshot 2, 124-2 may cover the revisions x to 8, wherein x may be 6 or 5, and the snapshot 3, 124-3 may cover the revisions y to 11, wherein y may be 9 or 8.

The respective snapshot 124 may then include the artifact documents 120 including the latest version of the artifact information items 122 from the lowest covered revision 134 to the highest covered revision 134.

As already mentioned above, in some examples, the content of the respective previous snapshot 124 or all previous snapshots 124 may also be taken into account to determine the respective present snapshot 124 which may allow to have the overview of all the available revisions 134.

The second example methodology may then continue with the acts illustrated in FIG. 3 and explained above in the context of the first example methodology, wherein the linkage key 126 may be configured to the presently adapted respective snapshot 124 taking only revisions 134 back to the previous snapshot 124 into account.

In some examples, each snapshot 124 may be determined only taking into account revisions 134 back to the respective previous snapshot 124. In some examples, the searched snapshot 124s may then be determined by determining a complete closest lower snapshot 124cc and by then appending the respective artifact documents 120 of the revisions 134 from the given revision 134-g of the complete closest lower snapshot 124cc up to the revision of interest 134-i, wherein the complete closest lower snapshot 124cc may be determined by appending to the closest lower snapshot 124c all previous, respective snapshots 124.

Figure 5:
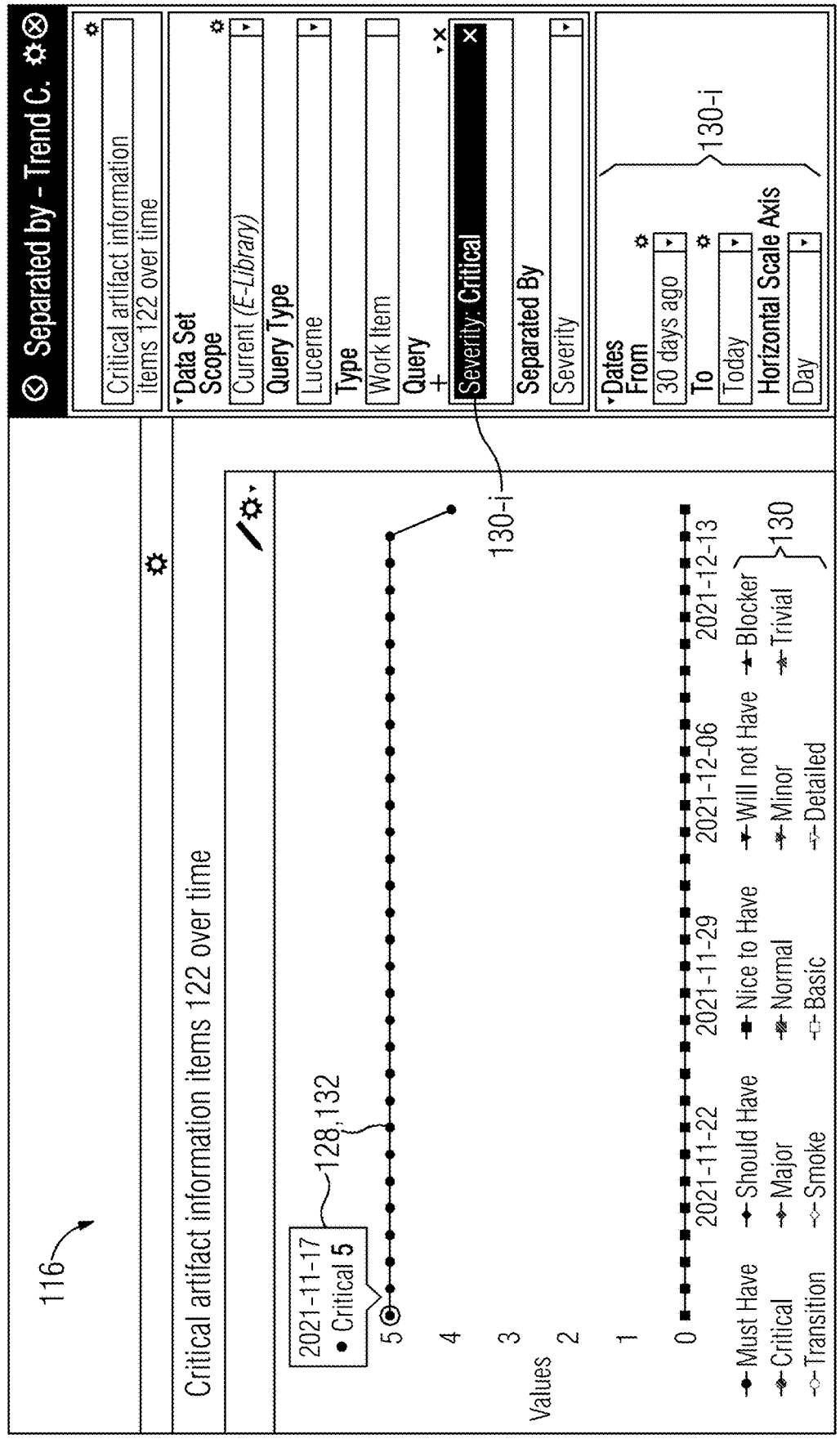
FIG. 5 illustrates an artifact information management user interface of an example system that facilitates managing artifact information in a product system.

With reference to FIG. 5, an artifact information management user interface 116 of an example system 100 that facilitates managing artifact information in a product system 100 illustrated.

In this example, the respective artifact information item 122 may be characterized by respective item metadata 130 which may relate to a severity level, a specific creation date of the respective artifact information item 122, a specific time period of creation of the respective artifact information item 122, a specific revision of interest 134-i or range of specific revisions of interest 134-i. Here, the user may provide user input corresponding to searching one or more searched artifact information item 122s characterized by the item metadata 130 "Severity" is "Critical" and a specific time period of creation of the respective artifact information item 122, namely covering the revision created during the last 30 days.

The information 128 displayed in the artifact information management UI 116 may then include the number 132 of the respective searched artifact information items 122s at the revision of interest 134-*i* complying with the received user's input, whereby the number 132 is determined and indicated for each day in the 30-day period. In the example illustrated in FIG. 5, the determined number 132 of the searched artifact information items 122 with "Severity" "Critical" is 5 for each day except for the last day of the 30-day period, for which the determined number 132 is 4.

Figure 6:
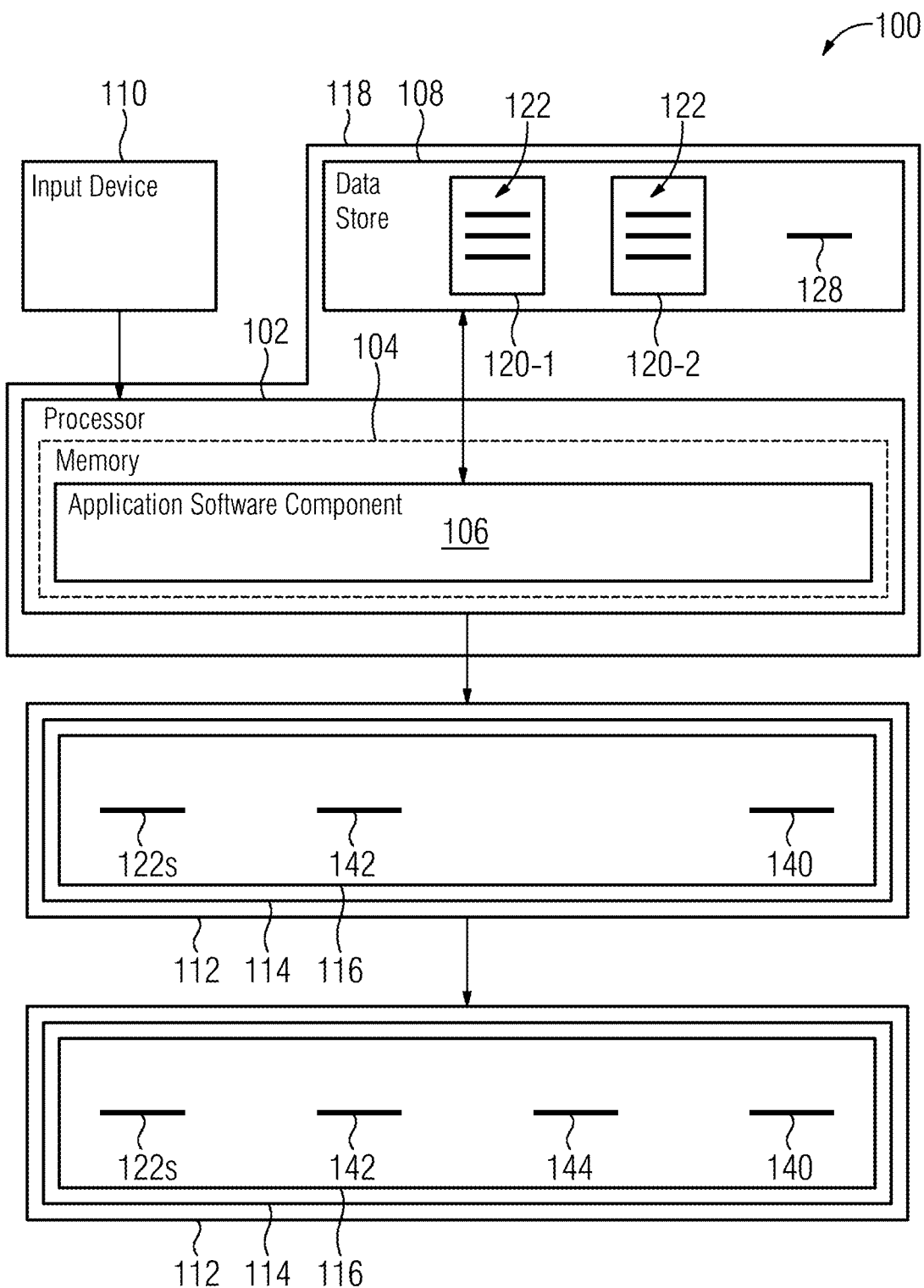
FIG. 6 illustrates a functional block diagram of a further example system that facilitates managing artifact information in a product system.

With reference to FIG. 6, a functional block diagram of a further example system 100 that facilitates managing artifact information in a product system 100 is illustrated.

Here, another artifact information item 142 is to be merged with the searched artifact information item 122s, whereby at least one merge action 140 available for merging the searched artifact information item 122s with the other artifact information item 142 may be determined. The searched artifact information item 122s may be included by the artifact document 120-1 and the other artifact information item 142 by the artifact document 120-2. The determined at least one merge action 140 may then be displayed to the user in the artifact information management UI 116. The user may then provide user input which may be captured, whereby the user's input may correspond to a selection of one of the displayed at least one merge action 140 in response to user interactions with the artifact information management UI 116. An amended artifact information item 144 may then be created by merging the searched artifact information item 122s with the other artifact information item 142 according to the selected merge action 140.

In further examples, the created amended artifact information item 144 may then be stored in a new artifact document 120-*n* assigned to a new revision 134-*n*, which may be stored in the data store 108. In some examples, the created amended artifact information item 144 may be stored as a newer version of the respective searched artifact information item 122s.

Figure 7:
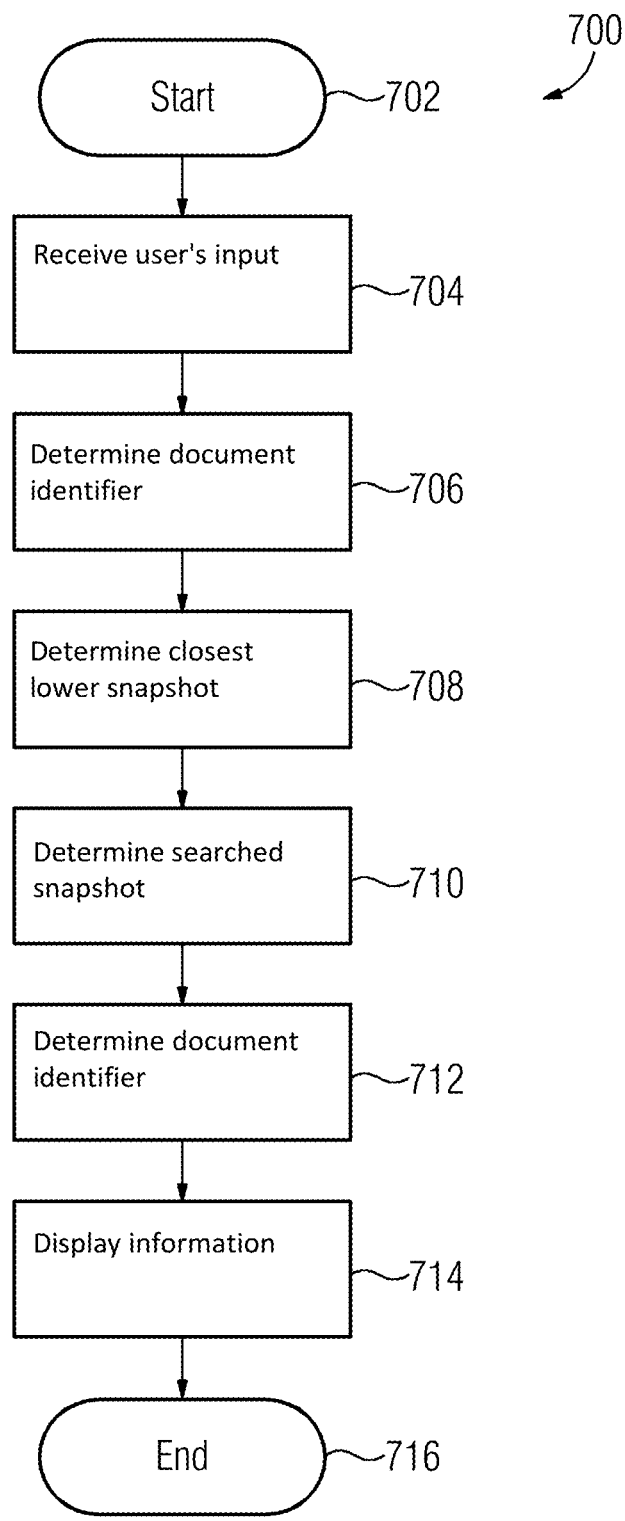
FIG. 7 illustrates flow diagram of another example methodology that facilitates managing artifact information in a product system, respectively.

Referring now to FIG. 7, a methodology 700 that facilitates managing artifact information, such as finding a respective searched artifact information item in a plurality of thousands of artifact documents, is illustrated. The method may start at 702 and the methodology may include several acts carried out through operation of at least one processor.

Herein a respective document identifier may be assigned to the respective the artifact document, wherein the artifact documents may include at least one artifact information item to which a respective item identifier may be assigned, respectively, wherein the artifact documents may include at least one artifact document assigned to a first revision of a sequence of a plurality of revisions, and at least one artifact document assigned to a subsequent revision, wherein a respective snapshot of a given revision may include the document identifiers of the respective artifact documents including the latest version of the respective artifact information item up to the given revision, and wherein a respective linkage key may link the respective revision to the respective snapshot.

These acts may include, in act 704, receiving a user's input corresponding to searching the respective searched artifact information item at a revision of interest.

Act 706 includes determining the respective document identifier of the respective artifact document including the respective searched artifact information item.

Act 708 includes determining the closest lower snapshot preceding or corresponding to the revision of interest using the respective linkage key.

Act 710 includes determining a searched snapshot by appending to closest lower snapshot the document identifiers of the respective artifact documents of the revisions from the given revision of the closest lower snapshot up to the revision of interest.

Act 712 includes determining the respective document identifier of the respective artifact document including the latest version of the respective searched artifact information item at the revision of interest by intersecting the determined respective document identifier of the respective artifact document including the respective searched artifact information item with the determined searched snapshot.

Act 714 includes displaying information relating to the respective searched artifact information item at the revision of interest using the respective artifact document corresponding to the determined respective document identifier to the user via an artifact information management user interface.

In act 716, the methodology may end.

The methodology 700 may include other acts and features discussed previously with respect to the computer-implemented method of managing artifact information, especially of finding a respective searched artifact information item in a plurality of thousands of artifact documents.

Figure 8:
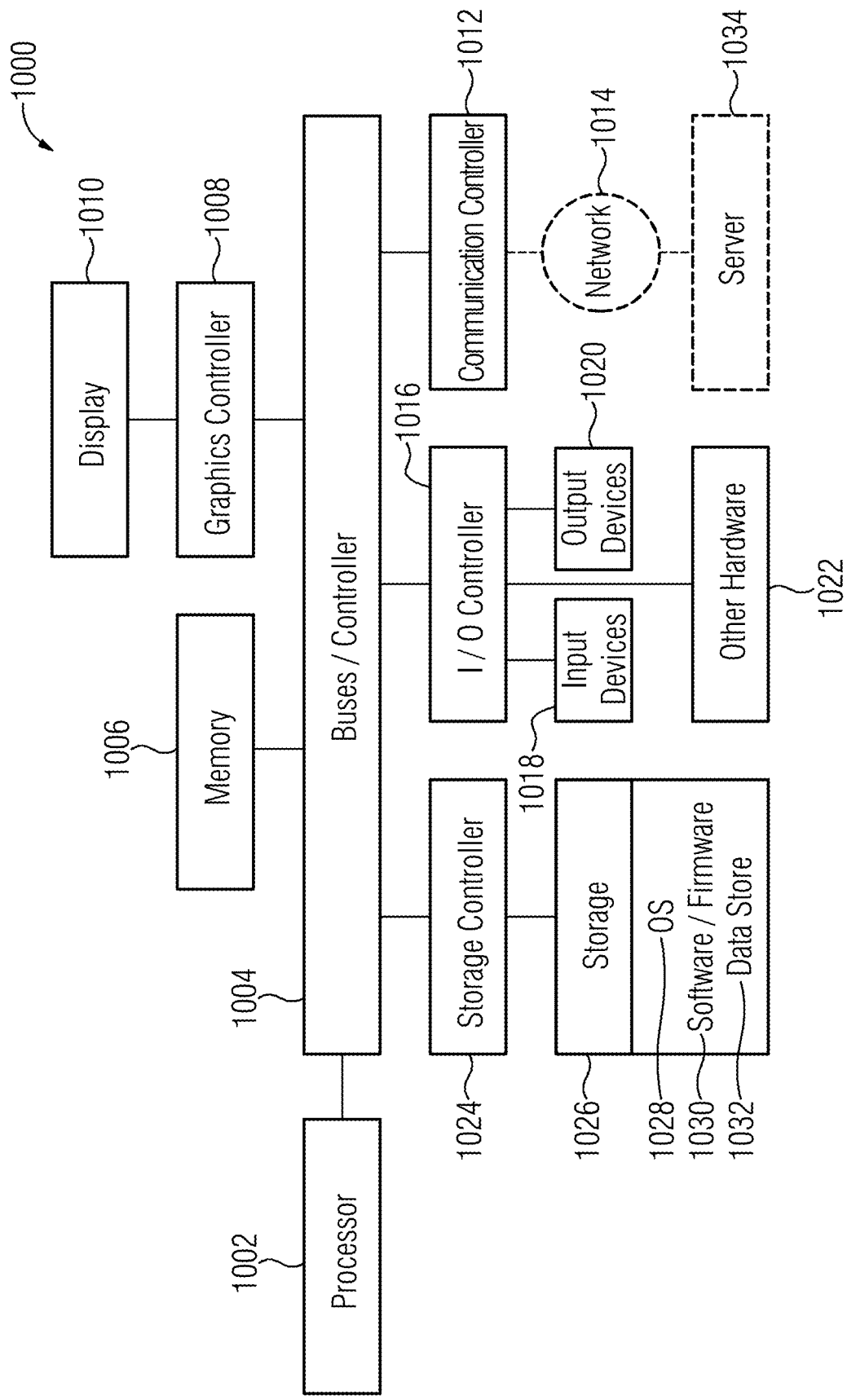
FIG. 8 illustrates a block diagram of a data processing system in which an embodiment may be implemented.

FIG. 8 illustrates a block diagram of a data processing system 1000 (also referred to as a computer system) in which an embodiment may be implemented, for example, as a portion of a product system, and/or other system operatively configured by software or otherwise to perform the processes as described herein. The data processing system 1000 may include the computer or IT system or data processing system 100 mentioned above. The data processing system depicted includes at least one processor 1002 (e.g., a CPU) that may be connected to one or more bridges/controllers/buses 1004 (e.g., a north bridge, a south bridge). One of the buses 1004 may include one or more I/O buses such as a PCI Express bus. Also connected to various buses in the depicted example may include a main memory 1006 (RAM) and a graphics controller 1008. The graphics controller 1008 may be connected to one or more display devices 1010. In some embodiments, one or more controllers (e.g., graphics, south bridge) may be integrated with the CPU (on the same chip or die). Examples of CPU architectures include IA-32, x86-64, and ARM processor architectures.

Other peripherals connected to one or more buses may include communication controllers 1012 (Ethernet controllers, WiFi controllers, cellular controllers) operative to connect to a local area network (LAN), Wide Area Network (WAN), a cellular network, and/or other wired or wireless networks 1014 or communication equipment.

Further components connected to various busses may include one or more I/O controllers 1016 such as USB controllers, Bluetooth controllers, and/or dedicated audio controllers (connected to speakers and/or microphones). Various peripherals may be connected to the I/O controller (s) (via various ports and connections) including input devices 1018 (e.g., keyboard, mouse, pointer, touch screen, touch pad, drawing tablet, trackball, buttons, keypad, game controller, gamepad, camera, microphone, scanners, motion sensing devices that capture motion gestures), output devices 1020 (e.g., printers, speakers) or any other type of device that is operative to provide inputs to or receive outputs from the data processing system. Also, many devices referred to as input devices or output devices may both provide inputs and receive outputs of communications with the data processing system. For example, the processor 1002 may be integrated into a housing (such as a tablet) that includes a touch screen that serves as both an input and display device. Further, some input devices (such as a laptop) may include a plurality of different types of input devices (e.g., touch screen, touch pad, keyboard). Also, other peripheral hardware 1022 connected to the I/O controllers 1016 may include any type of device, machine, or component that is configured to communicate with a data processing system.

Additional components connected to various busses may include one or more storage controllers 1024 (e.g., SATA). A storage controller may be connected to a storage device 1026 such as one or more storage drives and/or any associated removable media, which may be any suitable non-transitory machine usable or machine-readable storage medium. Examples include nonvolatile devices, volatile devices, read only devices, writable devices, ROMs, EPROMs, magnetic tape storage, floppy disk drives, hard disk drives, solid-state drives (SSDs), flash memory, optical disk drives (e.g., CDs, DVDs, Blu-ray), and other known optical, electrical, or magnetic storage devices drives and/or computer media. Also, in some examples, a storage device such as an SSD may be connected directly to an I/O bus 1004 such as a PCI Express bus.

A data processing system in accordance with an embodiment of the present disclosure may include an operating system 1028, software/firmware 1030, and data stores 1032 (e.g., that may be stored on a storage device 1026 and/or the memory 1006). Such an operating system may employ a command line interface (CLI) shell and/or a graphical user interface (GUI) shell. The GUI shell permits multiple display windows to be presented in the graphical user interface simultaneously, with each display window providing an interface to a different application or to a different instance of the same application. A cursor or pointer in the graphical user interface may be manipulated by a user through a pointing device such as a mouse or touch screen. The position of the cursor/pointer may be changed and/or an event, such as clicking a mouse button or touching a touch screen, may be generated to actuate a desired response. Examples of operating systems that may be used in a data processing system may include Microsoft Windows™, Linux™, UNIX™, iOS™, and Android™ operating systems. Also, examples of data stores include data files, data tables, relational database (e.g., Oracle™ Microsoft™ SQL Server), database servers, or any other structure and/or device that is capable of storing data, which is retrievable by a processor.

The communication controllers 1012 may be connected to the network 1014 (not a part of data processing system 1000), which may be any public or private data processing system network or combination of networks, as known to those of skill in the art, including the Internet. Data processing system 1000 may communicate over the network 1014 with one or more other data processing systems such as a server 1034 (also not part of the data processing system 1000). However, an alternative data processing system may correspond to a plurality of data processing systems implemented as part of a distributed system in which processors associated with several data processing systems may be in communication by way of one or more network connections and may collectively perform tasks described as being performed by a single data processing system. Thus, it is to be understood that when referring to a data processing system, such a system may be implemented across several data processing systems organized in a distributed system in communication with each other via a network.

Further, the term "controller" may refer to any device, system, or part thereof that controls at least one operation, whether such a device is implemented in hardware, firmware, software, or some combination of at least two of the same. The functionality associated with any particular controller may be centralized or distributed, whether locally or remotely.

In addition, data processing systems may be implemented as virtual machines in a virtual machine architecture or cloud environment. For example, the processor 1002 and associated components may correspond to a virtual machine executing in a virtual machine environment of one or more servers. Examples of virtual machine architectures include VMware ESCi, Microsoft Hyper-V, Xen, and KVM.

Those of ordinary skill in the art will appreciate that the hardware depicted for the data processing system may vary for particular implementations. For example, the data processing system 1000 in this example may correspond to a computer, workstation, server, PC, notebook computer, tablet, mobile phone, and/or any other type of apparatus/system that is operative to process data and carry out functionality and features described herein associated with the operation of a data processing system, computer, processor, and/or a controller discussed herein. The depicted example is provided for the purpose of explanation only and is not meant to imply architectural limitations with respect to the present disclosure.

Also, the processor described herein may be located in a server that is remote from the display and input devices described herein. In such an example, the described display device and input device may be included in a client device that communicates with the server (and/or a virtual machine executing on the server) through a wired or wireless network (which may include the Internet). In some embodiments, such a client device, for example, may execute a remote desktop application or may correspond to a portal device that carries out a remote desktop protocol with the server in order to send inputs from an input device to the server and receive visual information from the server to display through a display device. Examples of such remote desktop protocols include Teradici's PCoIP, Microsoft's RDP, and the RFB protocol. In such examples, the processor described herein may correspond to a virtual processor of a virtual machine executing in a physical processor of the server.

As used herein, the terms "component" and "system" are intended to encompass hardware, software, or a combination of hardware and software. Thus, for example, a system or component may be a process, a process executing on a processor, or a processor. Additionally, a component or system may be localized on a single device or distributed across several devices.

Also, as used herein a processor corresponds to any electronic device that is configured via hardware circuits, software, and/or firmware to process data. For example, processors described herein may correspond to one or more (or a combination) of a microprocessor, CPU, FPGA, ASIC, or any other integrated circuit (IC) or other type of circuit that is capable of processing data in a data processing system, which may have the form of a controller board, computer, server, mobile phone, and/or any other type of electronic device.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 1000 may conform to any of the various current implementations and practices known in the art.

Also, the words or phrases used herein should be construed broadly, unless expressly limited in some examples. For example, the terms "include" and "comprise," as well as derivatives thereof, mean inclusion without limitation. The singular forms "a", "an" and "the" are intended to include the plural forms as well, unless the context clearly indicates otherwise. Further, the term "and/or" as used herein refers to and encompasses any and all possible combinations of one or more of the associated listed items. The term "or" is inclusive, meaning and/or, unless the context clearly indicates otherwise. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Also, although the terms "first", "second", "third" and so forth may be used herein to describe various elements, functions, or acts, these elements, functions, or acts should not be limited by these terms. Rather these numeral adjectives are used to distinguish different elements, functions or acts from each other. For example, a first element, function, or act could be termed a second element, function, or act, and, similarly, a second element, function, or act could be termed a first element, function, or act, without departing from the scope of the present disclosure.

In addition, phrases such as "processor is configured to" carry out one or more functions or processes, may mean the processor is operatively configured to or operably configured to carry out the functions or processes via software, firmware, and/or wired circuits. For example, a processor that is configured to carry out a function/process may correspond to a processor that is executing the software/firmware, which is programmed to cause the processor to carry out the function/process and/or may correspond to a processor that has the software/firmware in a memory or storage device that is available to be executed by the processor to carry out the function/process. A processor "configured to" carry out one or more functions or processes may also correspond to a processor circuit particularly fabricated or "wired" to carry out the functions or processes (e.g., an ASIC or FPGA design). Further the phrase "at least one" before an element (e.g., a processor) that is configured to carry out more than one function may correspond to one or more elements (e.g., processors) that each carry out the functions and may also correspond to two or more of the elements (e.g., processors) that respectively carry out different ones of the one or more different functions.

In addition, the term "adjacent to" may mean that an element is relatively near to but not in contact with a further element, or that the element is in contact with the further portion, unless the context clearly indicates otherwise.

It is to be understood that the elements and features recited in the appended claims may be combined in different ways to produce new claims that likewise fall within the scope of the present disclosure. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present disclosure has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A computer-implemented method of finding a searched artifact information item in a plurality of artifact documents, wherein a respective document identifier is assigned to a respective artifact document of the plurality of artifact documents, wherein the plurality of artifact documents comprises at least one artifact information item to which a respective item identifier is assigned, respectively, wherein the plurality of artifact documents comprises at least one artifact document assigned to a first revision of a sequence of a plurality of revisions, and at least one artifact document assigned to a subsequent revision, wherein a respective snapshot of a given revision comprises document identifiers of the respective plurality of artifact documents comprising a latest version of a respective artifact information item up to a given revision, and wherein a respective linkage key links a respective revision to the respective snapshot of the given revision, the computer-implemented method comprising:

receiving, by at least one processor, an input of a user corresponding to searching a searched artifact information item at a revision of interest;

determining, by the at least one processor, the respective document identifier of the respective artifact document of the plurality of artifact documents comprising the searched artifact information item;

determining, by the at least one processor, a closest lower snapshot preceding to or corresponding to the revision of interest using the respective linkage key;

determining, by the at least one processor, a searched snapshot by appending, to the closest lower snapshot, the document identifiers of the respective plurality of artifact documents of the plurality of revisions from the given revision of the closest lower snapshot up to the revision of interest;

determining, by the at least one processor, the respective document identifier of the respective artifact document of the plurality of artifact documents comprising a latest version of the searched artifact information item at the revision of interest by intersecting the determined respective document identifier of the respective artifact document of the plurality of artifact documents comprising the searched artifact information item with the determined searched snapshot;

selecting, by the at least one processor, at least one merge action displayed in an artifact information management user interface (UI) available for merging the searched artifact information item with an additional artifact information item; and creating, by the at least one processor, a respective amended artifact information item by merging the searched artifact information item with the additional artifact information item according to a reference merge action of the selected at least one merge action displayed in the artifact information management UI.

2. The computer-implemented method of claim 1, further comprising:

displaying, by the at least one processor, information relating to the searched artifact information item at the revision of interest using the respective artifact document of the plurality of artifact documents corresponding to the determined respective document identifier of the respective artifact document of the plurality of artifact documents to the user via the artifact information management UI;

wherein the displayed information comprises the searched artifact information item at the revision of interest, and/or wherein the displayed information comprises the respective artifact document of the plurality of artifact documents corresponding to the determined respective document identifier of the respective artifact document of the plurality of artifact documents comprising the latest version of the searched artifact information item at the revision of interest.

3. The computer-implemented method of claim 2, wherein the closest lower snapshot corresponds to the revision of interest, and wherein the computer-implemented method further comprises:
determining, by the at least one processor, the searched snapshot to be the closest lower snapshot.

4. The computer-implemented method of claim 2, wherein the respective artifact information item is characterized by respective item metadata, and wherein the computer-implemented method further comprises:
receiving, by the at least one processor, an input of the user corresponding to a specification of item metadata of interest; and
determining, by the at least one processor, the searched artifact information item at the revision of interest using the specification of item metadata of interest.

5. The computer-implemented method of claim 2, wherein the displayed information comprises a number of respective searched artifact information items at the revision of interest complying with the received input of the user, and wherein the computer-implemented method further comprises:
determining, by the at least one processor, the number of the respective searched artifact information items complying with the received input of the user; and
displaying, by the at least one processor, the information comprising the number of the respective searched artifact information items to the user via the artifact information management UI, optionally as a function of a specification of item metadata of interest and/or as a function of time.

6. The computer-implemented method of claim 2, further comprising:
determining, by the at least one processor, the searched snapshot by appending, to the closest lower snapshot, the respective document identifier of the respective artifact document of the plurality of artifact documents comprising the latest version of the searched artifact information item of the plurality of revisions from the given revision of the closest lower snapshot up to the revision of interest.

7. The computer-implemented method of claim 2, further comprising:
determining, by the at least one processor, the respective snapshot of the given revision taking into account only revisions back to a previous snapshot.

8. The computer-implemented method of claim 2, further comprising:

capturing, by the at least one processor, an input of the user corresponding to the selection of the at least one merge action displayed in the artifact information management UI in response to interactions of the user with the artifact information management UI.

9. The computer-implemented method of claim 1, wherein the closest lower snapshot corresponds to the revision of interest, and wherein the computer-implemented method further comprises:
determining, by the at least one processor, the searched snapshot to be the closest lower snapshot.

10. The computer-implemented method of claim 1, wherein the respective artifact information item is characterized by respective item metadata, and wherein the computer-implemented method further comprises:
receiving, by the at least one processor, an input of the user corresponding to a specification of item metadata of interest; and
determining, by the at least one processor, the searched artifact information item at the revision of interest using the specification of item metadata of interest.

11. The computer-implemented method of claim 10, wherein the item metadata of interest relates to a severity level of the respective artifact information item, and/or wherein the item metadata of interest relates to a specific creation date of the respective artifact information item, a specific time period of creation of the respective artifact information item, a specific revision of interest or range of specific revisions of interest, or any combination thereof.

12. The computer-implemented method of claim 1, further comprising:
displaying, by the at least one processor, information relating to the searched artifact information item at the revision of interest using the respective artifact document of the plurality of artifact documents corresponding to the determined respective document identifier of the respective artifact document of the plurality of artifact documents to the user via the artifact information management UI, wherein the displayed information comprises a number of respective searched artifact information items at the revision of interest complying with the received input of the user, and wherein the computer-implemented method further comprises:
determining, by the at least one processor, the number of the respective searched artifact information items complying with the received input of the user; and
displaying, by the at least one processor, the information comprising the number of the respective searched artifact information items to the user via the artifact information management UI, optionally as a function of a specification of item metadata of interest and/or as a function of time.

13. The computer-implemented method of claim 1, further comprising:
determining, by the at least one processor, the respective snapshot of the given revision and optionally the respective linkage key prior to receiving the input of the user corresponding to searching the searched artifact information item at the revision of interest.

14. The computer-implemented method of claim 13, further comprising:

determining, by the at least one processor, the respective snapshot of the given revision and optionally the respective linkage key periodically, optionally taking into account computation and memory resources available or required to determine at least one of the respective snapshot of the given revision, the respective linkage key, a respective document identifier of the searched artifact information item, or any combination thereof.

15. The computer-implemented method of claim 1, further comprising:
determining, by the at least one processor, the searched snapshot by appending, to the closest lower snapshot, the respective document identifier of the respective artifact document of the plurality of artifact documents comprising the latest version of the searched artifact information item of the plurality of revisions from the given revision of the closest lower snapshot up to the revision of interest.

16. The computer-implemented method of claim 1, further comprising:
determining, by the at least one processor, the respective snapshot of the given revision taking into account only revisions back to a previous snapshot.

17. A computer system comprising:
at least one processor configured to:
receive an input of a user corresponding to searching a searched artifact information item at a revision of interest;
determine a document identifier of an artifact document of a plurality of artifact documents comprising the searched artifact information item;
determine a closest lower snapshot preceding to or corresponding to the revision of interest using a linkage key;
determine a searched snapshot by appending, to the closest lower snapshot, document identifiers of the plurality of artifact documents of a plurality of revisions from a given revision of the closest lower snapshot up to the revision of interest;
determine the document identifier of the artifact document of the plurality of artifact documents comprising a latest version of the searched artifact information item at the revision of interest by intersecting the determined document identifier of the artifact document of the plurality of artifact documents comprising the searched artifact information item with the determined searched snapshot;
select at least one merge action displayed in an artifact information management user interface (UI) available for merging the searched artifact information item with an additional artifact information item; and
create a respective amended artifact information item by merging the searched artifact information item with the additional artifact information item according to a reference merge action of the selected at least one merge action displayed in the artifact information management UI.

18. A non-transitory computer program product comprising computer program code that, when executed by a computer system, cause the computer system to:
receive an input of a user corresponding to searching a searched artifact information item at a revision of interest;
determine a document identifier of an artifact document of a plurality of artifact documents comprising the searched artifact information item;
determine a closest lower snapshot preceding to or corresponding to the revision of interest using a linkage key;
determine a searched snapshot by appending, to the closest lower snapshot, document identifiers of the plurality of artifact documents of a plurality of revisions from a given revision of the closest lower snapshot up to the revision of interest;
determine the document identifier of the artifact document of the plurality of artifact documents comprising a latest version of the searched artifact information item at the revision of interest by intersecting the determined document identifier of the artifact document of the plurality of artifact documents comprising the searched artifact information item with the determined searched snapshot;
select at least one merge action displayed in an artifact information management user interface (UI) available for merging the searched artifact information item with an additional artifact information item; and
create a respective amended artifact information item by merging the searched artifact information item with the additional artifact information item according to a reference merge action of the selected at least one merge action displayed in the artifact information management UI.

* * * * *